US012684370B2

(12) United States Patent
Ma et al.

(10) Patent No.: US 12,684,370 B2
(45) Date of Patent: Jul. 14, 2026

(54) MANAGING BEAM COVERAGE AREA REPRESENTATIONS IN WIRELESS COMMUNICATIONS SYSTEMS

(71) Applicant: QUALCOMM INCORPORATED, San Diego, CA (US)

(72) Inventors: Liangping Ma, San Diego, CA (US); Xiao Feng Wang, San Diego, CA (US); Ayan Sengupta, San Diego, CA (US); Alberto Rico Alvarino, San Diego, CA (US); Bharat Shrestha, San Diego, CA (US); Jun Ma, San Diego, CA (US); Peter Gaal, San Diego, CA (US); Umesh Phuyal, San Diego, CA (US); Dan Zhang, San Diego, CA (US); Huilin Xu, Temecula, CA (US); Yiqing Cao, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 685 days.

(21) Appl. No.: 18/000,927

(22) PCT Filed: Jul. 2, 2020

(86) PCT No.: PCT/CN2020/099885
§ 371 (c)(1),
(2) Date: Dec. 6, 2022

(87) PCT Pub. No.: WO2022/000409
PCT Pub. Date: Jan. 6, 2022

(65) Prior Publication Data
US 2023/0224725 A1 Jul. 13, 2023

(51) Int. Cl.
*H04W 16/28* (2009.01)
*H04B 7/08* (2006.01)

(52) U.S. Cl.
CPC ............ *H04W 16/28* (2013.01); *H04B 7/088* (2013.01)

(58) Field of Classification Search
CPC ............................... H04W 16/28; H04B 7/088
See application file for complete search history.

(56) References Cited

U.S. PATENT DOCUMENTS

| | | | |
|---|---|---|---|
| 2015/0229385 A1 | 8/2015 | Roos | |
| 2017/0012688 A1 | 1/2017 | Salamat et al. | |

(Continued)

FOREIGN PATENT DOCUMENTS

| | | |
|---|---|---|
| CN | 106471751 A | 3/2017 |
| CN | 109845120 A | 6/2019 |

(Continued)

OTHER PUBLICATIONS

Co-pending U.S. Appl. No. 17/304,528, inventor Ma; Liangping, filed Jun. 22, 2021.

(Continued)

*Primary Examiner* — Ricky Q Ngo
*Assistant Examiner* — Stephen N Steiner
(74) *Attorney, Agent, or Firm* — Holland & Hart LLP

(57) ABSTRACT

Methods, systems, and devices for wireless communications are described. A communication device, otherwise known as a user equipment (UE) may determine a beam configuration associated with a set of directional beams of a base station. The beam configuration may include a set of identifiers associated with the set of directional beams. The UE may determine beam position information associated with a coverage area of each directional beam of the set of directional beams based on the beam configuration. Additionally or alternatively, the UE may determine beam classification information associated with the coverage area of each directional beam of the set of directional beams based on the (Continued)

300 beam configuration. The UE may select a directional beam of the set of directional beams based on the beam position information and the beam classification information, and communicate with the base station using the selected directional beam.

32 Claims, 17 Drawing Sheets

(56) References Cited

U.S. PATENT DOCUMENTS

| | | | | |
|---|---|---|---|---|
| 2018/0123648 | A1* | 5/2018 | Nagaraja | H04B 17/15 |
| 2019/0207676 | A1 | 7/2019 | Noerpel et al. | |
| 2019/0335441 | A1 | 10/2019 | Bai et al. | |
| 2020/0052782 | A1 | 2/2020 | Wang et al. | |
| 2020/0145855 | A1 | 5/2020 | Hahn et al. | |
| 2020/0314663 | A1* | 10/2020 | Wang | H04W 76/10 |
| 2020/0382205 | A1* | 12/2020 | Tugend | H01Q 1/288 |
| 2021/0384966 | A1* | 12/2021 | Buer | H01Q 25/001 |
| 2023/0232384 | A1 | 7/2023 | Ma et al. | |

FOREIGN PATENT DOCUMENTS

| | | |
|---|---|---|
| CN | 109891769 A | 6/2019 |
| EP | 1231722 A2 | 8/2002 |
| WO | WO-2018080660 A1 | 5/2018 |

OTHER PUBLICATIONS

Co-pending U.S. Appl. No. 17/304,955, inventor Ma; Liangping, filed Jun. 29, 2021.
Co-pending U.S. Appl. No. 17/324,982, inventor Shrestha; Bharat, filed May 19, 2021.
Co-pending U.S. Appl. No. 17/359,291, inventor Ma; Liangping, filed Jun. 25, 2021.
Co-pending U.S. Appl. No. 17/359,377, inventor Ma; Liangping, filed Jun. 25, 2021.
International Search Report and Written Opinion—PCT/CN2020/099885—ISA/EPO—Apr. 1, 2021.
CMCC: "Utilization of Beam Footprint Information", R2-1815256 3rd Generation Partnership Project Mobile Competence Centre, 650, Route Des Lucioles, F-06921 Sophia-Antipolis Cedex France vol. RAN WG2, No. Chengdu, China, Oct. 8, 2018-Oct. 12, 2018, Sep. 28, 2018, XP051524612, 2 Pages, Section 2, First Passage.
Supplementary European Search Report—EP20942554—Search Authority—Munich—Jan. 29, 2024.

* cited by examiner

Receiver

1110

Base Station
Communications Manager

1115

Transmitter

1120

1105

1100

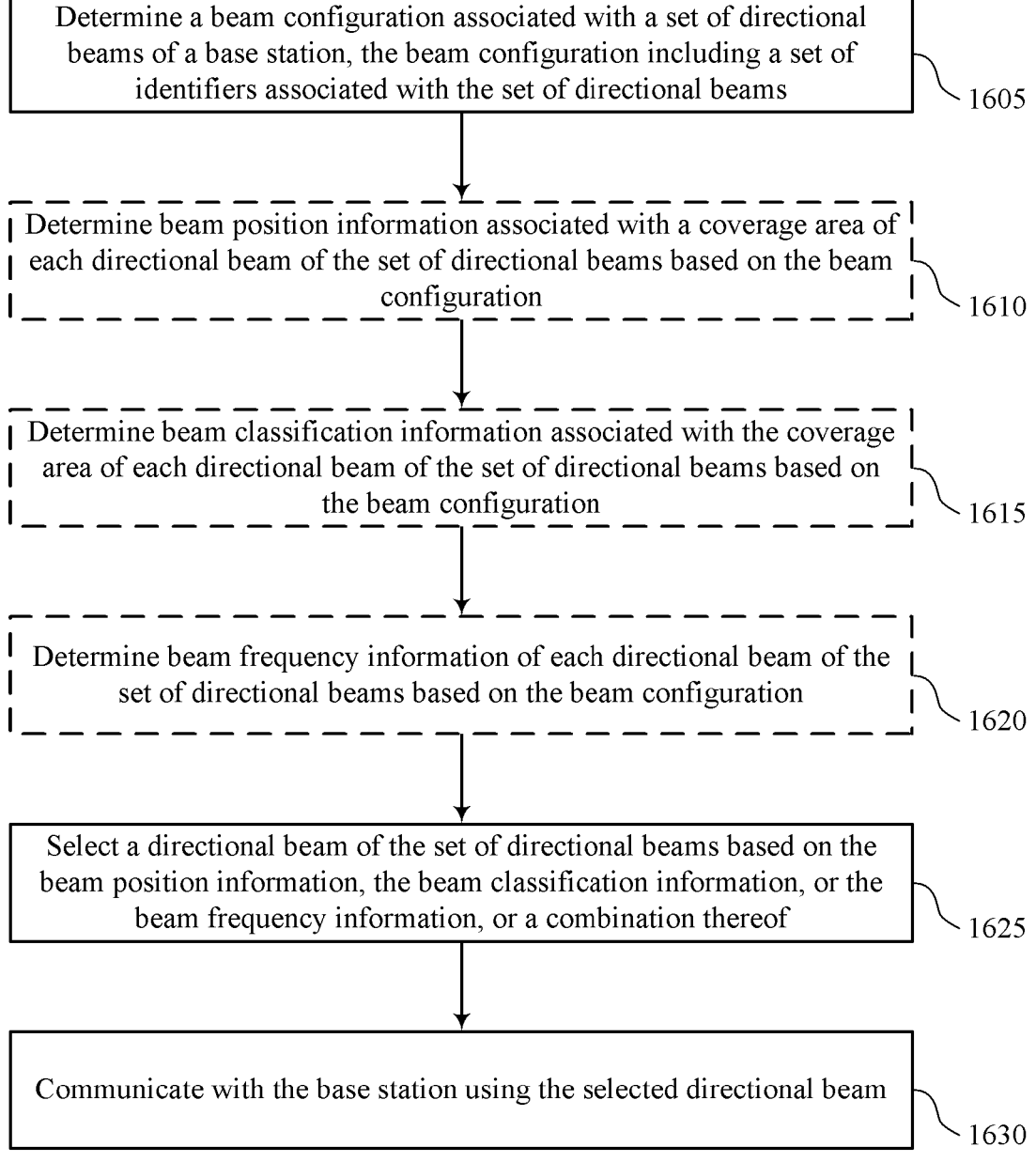

Determine a beam configuration associated with a set of directional beams of a base station, the beam configuration including a set of identifiers associated with the set of directional beams

1605

Determine beam position information associated with a coverage area of each directional beam of the set of directional beams based on the beam configuration

1610

Determine beam classification information associated with the coverage area of each directional beam of the set of directional beams based on the beam configuration

1615

Determine beam frequency information of each directional beam of the set of directional beams based on the beam configuration

1620

Select a directional beam of the set of directional beams based on the beam position information, the beam classification information, or the beam frequency information, or a combination thereof

1625

Communicate with the base station using the selected directional beam

Determine a beam configuration associated with a set of directional beams of the base station, the beam configuration including an identifier of the base station and a set of identifiers associated with the set of directional beams

1705

Transmit the beam configuration to a UE

1710

1700

MANAGING BEAM COVERAGE AREA REPRESENTATIONS IN WIRELESS COMMUNICATIONS SYSTEMS

CROSS REFERENCE

The present Application is a 371 national stage filing of International PCT Application No. PCT/CN2020/099885 by MA et al. entitled "MANAGING BEAM COVERAGE AREA REPRESENTATIONS IN WIRELESS COMMUNICATIONS SYSTEMS," filed Jul. 2, 2020, which is assigned to the assignee hereof, and which is expressly incorporated by reference in its entirety herein.

INTRODUCTION

The following relates to wireless communications and more specifically to managing beam coverage areas.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

A method of wireless communication at a UE is described. The method may include determining a beam configuration associated with a set of directional beams of a base station, the beam configuration including a set of identifiers associated with the set of directional beams, determining beam position information associated with a coverage area of each directional beam of the set of directional beams based on the beam configuration, determining beam classification information associated with the coverage area of each directional beam of the set of directional beams based on the beam configuration, selecting a directional beam of the set of directional beams based on the beam position information and the beam classification information, and communicating with the base station using the directional beam.

An apparatus for wireless communication is described. The apparatus may include a processor, memory coupled with the processor, and instructions stored in the memory. The instructions may be executable by the processor to cause the apparatus to determine a beam configuration associated with a set of directional beams of a base station, the beam configuration including a set of identifiers associated with the set of directional beams, determine beam position information associated with a coverage area of each directional beam of the set of directional beams based on the beam configuration, determine beam classification information associated with the coverage area of each directional beam of the set of directional beams based on the beam configuration, select a directional beam of the set of directional beams based on the beam position information and the beam classification information, and communicate with the base station using the directional beam.

Another apparatus for wireless communication is described. The apparatus may include means for determining a beam configuration associated with a set of directional beams of a base station, the beam configuration including a set of identifiers associated with the set of directional beams, determining beam position information associated with a coverage area of each directional beam of the set of directional beams based on the beam configuration, determining beam classification information associated with the coverage area of each directional beam of the set of directional beams based on the beam configuration, selecting a directional beam of the set of directional beams based on the beam position information and the beam classification information, and communicating with the base station using the directional beam.

A non-transitory computer-readable medium storing code for wireless communication at a UE is described. The code may include instructions executable by a processor to determine a beam configuration associated with a set of directional beams of a base station, the beam configuration including a set of identifiers associated with the set of directional beams, determine beam position information associated with a coverage area of each directional beam of the set of directional beams based on the beam configuration, determine beam classification information associated with the coverage area of each directional beam of the set of directional beams based on the beam configuration, select a directional beam of the set of directional beams based on the beam position information and the beam classification information, and communicate with the base station using the directional beam.

In some examples of the method, apparatuses, and non-transitory computer-readable medium described herein, determining the beam position information may include operations, features, means, or instructions for determining position coordinates of a center of each coverage area of each directional beam of the set of directional beams.

In some examples of the method, apparatuses, and non-transitory computer-readable medium described herein, determining the position coordinates may include operations, features, means, or instructions for determining the position coordinates of the center of each coverage area of each directional beam as a function of time.

In some examples of the method, apparatuses, and non-transitory computer-readable medium described herein, determining the beam position information may include operations, features, means, or instructions for determining a set of position coordinates associated with a boundary of each coverage area of each directional beam of the set of directional beams.

Some examples of the method, apparatuses, and non-transitory computer-readable medium described herein may further include operations, features, means, or instructions for determining a reference directional beam of the set of directional beams based on the beam configuration, where determining the beam position information includes determining position coordinates of a center of a coverage area of the reference directional beam of the set of directional beams.

In some examples of the method, apparatuses, and non-transitory computer-readable medium described herein, determining the position coordinates may include operations, features, means, or instructions for determining the position coordinates of the center of the coverage area of the reference directional beam as a function of time.

Some examples of the method, apparatuses, and non-transitory computer-readable medium described herein may further include operations, features, means, or instructions for determining other position coordinates of other centers of other coverage areas of other directional beams of the set of directional beams based on the position coordinates of the center of the coverage area of the reference directional beam and location information associated with the set of directional beams.

Some examples of the method, apparatuses, and non-transitory computer-readable medium described herein may further include operations, features, means, or instructions for determining a scaling factor associated with the position coordinates of the center of the coverage area of the reference directional beam, where determining the other position coordinates includes determining the other position coordinates of the other centers of the other coverage areas of the other directional beams based on scaling the position coordinates of the center of the coverage area of the reference directional beam by the scaling factor.

In some examples of the method, apparatuses, and non-transitory computer-readable medium described herein, determining the beam classification information may include operations, features, means, or instructions for determining a shape of the coverage area of each directional beam of the set of directional beams, where the shape of the coverage area includes an ellipse shape, a circle shape, or a hexagon shape, or any combination thereof.

In some examples of the method, apparatuses, and non-transitory computer-readable medium described herein, determining the beam classification information may include operations, features, means, or instructions for determining a size of the coverage area of each directional beam of the set of directional beams, where the size of the coverage area corresponds to a semi-major axis associated with each directional beam or a semi-minor axis associated with each directional beam, or both.

In some examples of the method, apparatuses, and non-transitory computer-readable medium described herein, determining the beam classification information may include operations, features, means, or instructions for determining an orientation of the coverage area of each directional beam of the set of directional beams.

In some examples of the method, apparatuses, and non-transitory computer-readable medium described herein, determining the orientation of the coverage area of each directional beam of the set of directional beams may include operations, features, means, or instructions for determining an angle between a predefined line of the coverage area of each directional beam of the set of directional beams and a direction of motion associated with the base station.

In some examples of the method, apparatuses, and non-transitory computer-readable medium described herein, determining the orientation of the coverage area of each directional beam of the set of directional beams may include operations, features, means, or instructions for determining an angle between a semi-minor axis associated with each directional beam of the set of directional beams and a direction of motion associated with the base station.

In some examples of the method, apparatuses, and non-transitory computer-readable medium described herein, determining the beam classification information may include operations, features, means, or instructions for determining a direction of a center of the coverage area of each directional beam of the set of directional beams, where the direction includes an azimuth angle or a zenith angle, or both.

In some examples of the method, apparatuses, and non-transitory computer-readable medium described herein, determining the beam classification information may include operations, features, means, or instructions for determining a width of each directional beam of the set of directional beams.

In some examples of the method, apparatuses, and non-transitory computer-readable medium described herein, determining the beam classification information may include operations, features, means, or instructions for determining position coordinates of a center of each coverage area of each directional beam of the set of directional beams based on a direction of a center of a coverage area of a directional beam, a width of a directional beam, or a height associated with the base station, or any combination thereof, the base station including a non-terrestrial base station or a non-terrestrial relay station.

Some examples of the method, apparatuses, and non-transitory computer-readable medium described herein may further include operations, features, means, or instructions for determining beam frequency information of each directional beam of the set of directional beams based on the beam configuration, where selecting the directional beam includes selecting the directional beam of the set of directional beams based on the beam frequency information.

Some examples of the method, apparatuses, and non-transitory computer-readable medium described herein may further include operations, features, means, or instructions for determining that each directional beam of the set of directional beams operates in a separate frequency interval based on the beam frequency information.

In some examples of the method, apparatuses, and non-transitory computer-readable medium described herein, determining that each directional beam of the set of directional beams operates in the separate frequency interval may include operations, features, means, or instructions for determining that each directional beam of the set of directional beams operates in a separate bandwidth part based on the beam frequency information.

Some examples of the method, apparatuses, and non-transitory computer-readable medium described herein may further include operations, features, means, or instructions for receiving a system information message including the beam configuration, the system information message including a system information block, where determining the beam configuration includes determining the beam configuration associated with the set of directional beams of the base station based on the system information message.

Some examples of the method, apparatuses, and non-transitory computer-readable medium described herein may further include operations, features, means, or instructions for receiving a radio resource control message including the beam configuration, where determining the beam configuration includes determining the beam configuration associated with the set of directional beams of the base station based on the radio resource control message.

In some examples of the method, apparatuses, and non-transitory computer-readable medium described herein, the UE may be preconfigured with the beam configuration.

Some examples of the method, apparatuses, and non-transitory computer-readable medium described herein may further include operations, features, means, or instructions for receiving an identifier of the base station, where the base station includes a non-terrestrial base station or a non-terrestrial relay station, mapping the identifier of the base station to the set of identifiers associated with the set of directional beams, and associating the set of directional beams to the base station based on the mapping.

Some examples of the method, apparatuses, and non-transitory computer-readable medium described herein may further include operations, features, means, or instructions for determining that each directional beam of the set of directional beams include a single cell based on the beam configuration.

Some examples of the method, apparatuses, and non-transitory computer-readable medium described herein may further include operations, features, means, or instructions for determining that each directional beam of the set of directional beams includes a separate cell based on the beam configuration.

In some examples of the method, apparatuses, and non-transitory computer-readable medium described herein, the base station includes a satellite.

A method of wireless communication at a base station is described. The method may include determining a beam configuration associated with a set of directional beams of the base station, the beam configuration including an identifier of the base station and a set of identifiers associated with the set of directional beams and transmitting the beam configuration to a UE.

An apparatus for wireless communication is described. The apparatus may include a processor, memory coupled with the processor, and instructions stored in the memory. The instructions may be executable by the processor to cause the apparatus to determine a beam configuration associated with a set of directional beams of the apparatus, the beam configuration including an identifier of the apparatus and a set of identifiers associated with the set of directional beams and transmit the beam configuration to a UE.

Another apparatus for wireless communication is described. The apparatus may include means for determining a beam configuration associated with a set of directional beams of the apparatus, the beam configuration including an identifier of the apparatus and a set of identifiers associated with the set of directional beams and transmitting the beam configuration to a UE.

A non-transitory computer-readable medium storing code for wireless communication at a base station is described. The code may include instructions executable by a processor to determine a beam configuration associated with a set of directional beams of the base station, the beam configuration including an identifier of the base station and a set of identifiers associated with the set of directional beams and transmit the beam configuration to a UE.

Some examples of the method, apparatuses, and non-transitory computer-readable medium described herein may further include operations, features, means, or instructions for determining beam position information associated with a coverage area of each directional beam of the set of directional beams, where the beam configuration includes the beam position information associated with the coverage area of each directional beam of the set of directional beams.

In some examples of the method, apparatuses, and non-transitory computer-readable medium described herein, determining the beam position information may include operations, features, means, or instructions for determining position coordinates of a center of each coverage area of each directional beam of the set of directional beams.

In some examples of the method, apparatuses, and non-transitory computer-readable medium described herein, determining the position coordinates may include operations, features, means, or instructions for determining the position coordinates of the center of each coverage area of each directional beam as a function of time.

In some examples of the method, apparatuses, and non-transitory computer-readable medium described herein, determining the beam position information may include operations, features, means, or instructions for determining a set of position coordinates associated with a boundary of each coverage area of each directional beam of the set of directional beams.

Some examples of the method, apparatuses, and non-transitory computer-readable medium described herein may further include operations, features, means, or instructions for determining beam classification information associated with a coverage area of each directional beam of the set of directional beams, where the beam configuration includes the beam classification information associated with the coverage area of each directional beam of the set of directional beams.

In some examples of the method, apparatuses, and non-transitory computer-readable medium described herein, determining the beam classification information may include operations, features, means, or instructions for determining a shape of the coverage area of each directional beam of the set of directional beams, where the shape of the coverage area includes an ellipse shape, a circle shape, or a hexagon shape, or any combination thereof.

In some examples of the method, apparatuses, and non-transitory computer-readable medium described herein, determining the beam classification information may include operations, features, means, or instructions for determining a size of the coverage area of each directional beam of the set of directional beams, where the size of the coverage area corresponds to a semi-major axis associated with each directional beam or a semi-minor axis associated with each directional beam, or both.

In some examples of the method, apparatuses, and non-transitory computer-readable medium described herein, determining the beam classification information may include operations, features, means, or instructions for determining an orientation of the coverage area of each directional beam of the set of directional beams.

In some examples of the method, apparatuses, and non-transitory computer-readable medium described herein, determining the beam classification information may include operations, features, means, or instructions for determining a direction of a center of the coverage area of each directional beam of the set of directional beams, where the direction includes an azimuth angle or a zenith angle, or both.

In some examples of the method, apparatuses, and non-transitory computer-readable medium described herein, determining the beam classification information may include operations, features, means, or instructions for determining a width of each directional beam of the set of directional beams.

In some examples of the method, apparatuses, and non-transitory computer-readable medium described herein, determining the beam classification information may include operations, features, means, or instructions for determining position coordinates of a center of each coverage area of each directional beam of the set of directional beams based on a direction of a center of a coverage area of a directional beam, a width of a directional beam, or a height associated with the base station, or any combination thereof.

Some examples of the method, apparatuses, and non-transitory computer-readable medium described herein may further include operations, features, means, or instructions for determining beam frequency information of each directional beam of the set of directional beams, where the beam configuration includes the beam frequency information of each directional beam of the set of directional beams.

In some examples of the method, apparatuses, and non-transitory computer-readable medium described herein, each directional beam of the set of directional beams operates in a separate frequency interval.

In some examples of the method, apparatuses, and non-transitory computer-readable medium described herein, each directional beam of the set of directional beams operates in a separate bandwidth part.

In some examples of the method, apparatuses, and non-transitory computer-readable medium described herein, transmitting the beam configuration may include operations, features, means, or instructions for transmitting a system information message including the beam configuration, the system information message including a system information block.

In some examples of the method, apparatuses, and non-transitory computer-readable medium described herein, transmitting the beam configuration may include operations, features, means, or instructions for transmitting a radio resource control message including the beam configuration.

In some examples of the method, apparatuses, and non-transitory computer-readable medium described herein, each directional beam of the set of directional beams include a single cell.

In some examples of the method, apparatuses, and non-transitory computer-readable medium described herein, each directional beam of the set of directional beams includes a separate cell.

In some examples of the method, apparatuses, and non-transitory computer-readable medium described herein, the base station includes a satellite.

In some examples of the method, apparatuses, and non-transitory computer-readable medium described herein, the base station includes a non-terrestrial base station or a non-terrestrial relay station.

BRIEF DESCRIPTION OF THE DRAWINGS

FIGS. 15 through 17 show flowcharts illustrating methods that support managing beam coverage area representations in wireless communications systems in accordance with one or more aspects of the present disclosure.

DETAILED DESCRIPTION

Figure 1:
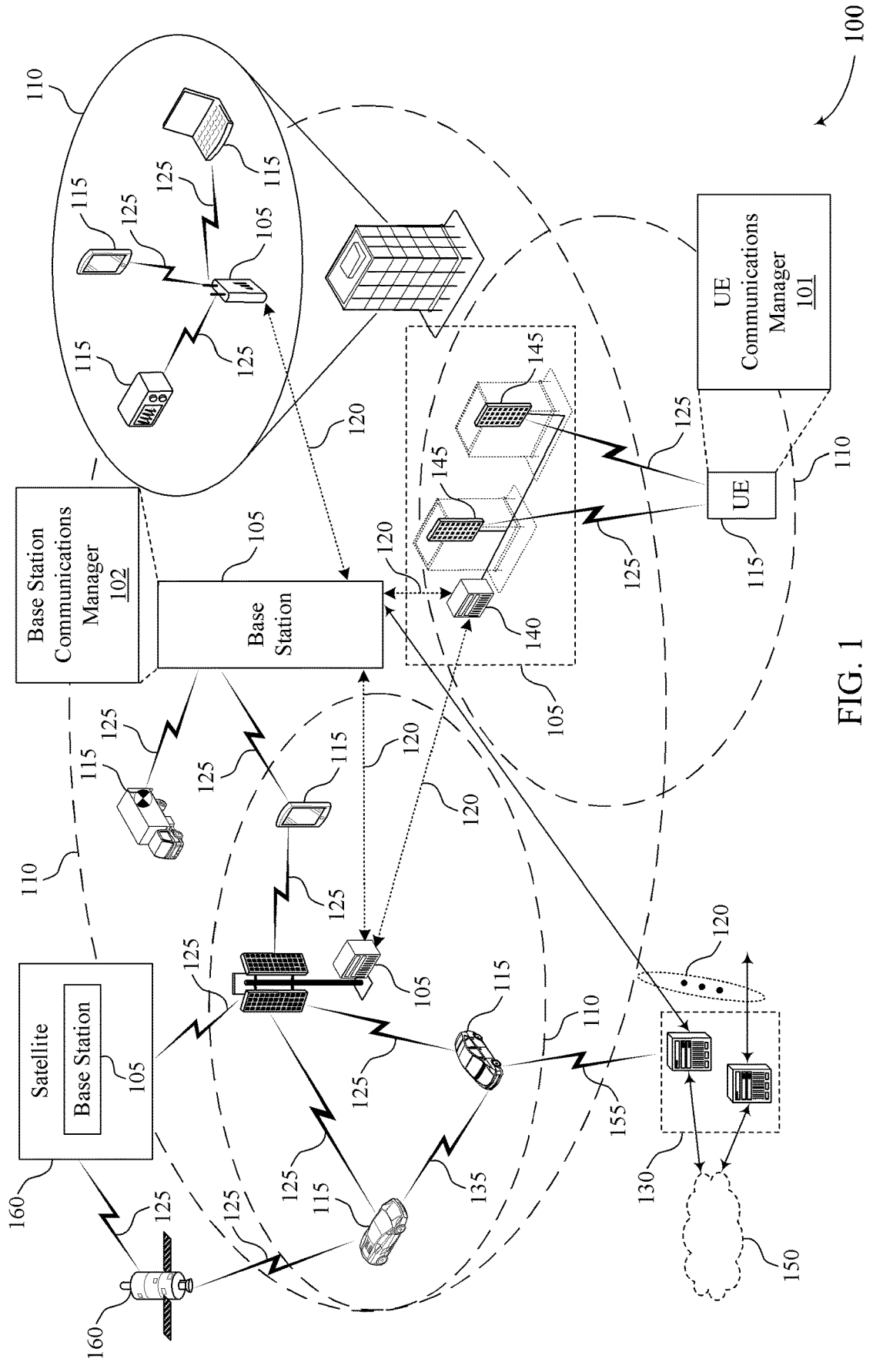
FIGS. 1 and 2 illustrate examples of wireless communications systems that support managing beam coverage area representations in accordance with one or more aspects of the present disclosure.

Wireless communications systems may include multiple communication devices such as UEs and base stations, which may provide wireless communication services to other UEs. For example, base stations may be next-generation NodeBs or giga-NodeBs (either of which may be referred to as a gNB) that may support multiple radio access technologies including 4G systems, such as LTE systems, as well as 5G systems, which may be referred to as NR systems. Some wireless communications systems, such as non-terrestrial communications systems may use beamformed communications. For example, a satellite in a low-earth orbit (LEO) system, a medium earth orbit (MEO) system, or a global navigation satellite system (GNSS) may use multiple antennas to form multiple narrow beams to communicate with the UEs on the ground. These beams may collectively provide a single coverage area (also referred to as a cell) or each beam may provide a separate coverage area. Each beam may also operate on different frequency resources (e.g., different bandwidth parts) to mitigate interference between the beams. Due to high mobility and limited beam coverage (e.g., for satellites in a LEO system, etc.), the UEs may attempt to select a different beam or coverage area when communicating with the satellite. However, the UEs may not be configured or have information regarding the satellite's beam configuration (e.g., beam coverage areas, etc.), which may negatively impact the beam selection operation for the UEs.

Various aspects of the described techniques relate to the UEs having knowledge of the beam configuration for each beam's coverage area (e.g., beam footprint) to assist with the beam selection operation. In order to improve reliability and reduce latency related to beam selection for beamformed communications with a satellite, the UEs may be preconfigured with the beam configuration. Alternatively, the UEs may be configured to receive the beam configuration from a network device (e.g., a base station, a gateway device) via a broadcast message, such as a system information message or a radio resource control (RRC) message. The beam configuration may include beam position information (e.g., coordinates for a center of each of the beam coverage areas) and beam classification information (e.g., a shape, a size, and/or an orientation of each beam). The UEs may also be configured with beam frequency association information that links each of the beam coverage areas with a frequency interval, which could be in the form of a bandwidth part. As a result, the UEs may support efficient beam selection operation for beamformed communications using the information in the beam configuration.

Various aspects of the subject matter described herein may be implemented to realize one or more potential advantages, including providing benefits and enhancements to the operation of the UEs. In some examples, the operations performed by the UE for beam selection or cell switching may improve beamformed communications by reducing or eliminating interference between directional beams of a base station (e.g., a satellite). In some examples, operations performed by the UEs may support improvements to power consumption, reliability for beamformed communications, spectral efficiency, higher data rates and, in some examples, low latency for beamformed communications, among other benefits.

Aspects of the disclosure are initially described in the context of wireless communications systems. Aspects of the disclosure are further illustrated by and described with reference to apparatus diagrams, system diagrams, and flowcharts that relate to managing beam coverage area representations in wireless communications systems in accordance with one or more aspects of the present disclosure.

FIG. 1 illustrates an example of a wireless communications system 100 that supports managing beam coverage area representations in accordance with one or more aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. A UE 115 may communicate with the core network 130 through a communication link 155. One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

The wireless communications system 100 may also include one or more satellites 160. A satellite 160 may communicate with the base stations 105 (also referred to as gateways in NTNs) and the UEs 115 (or other high altitude or terrestrial communications devices). The satellite 160 may be any suitable type of communication satellite configured to relay communications between different end nodes in a wireless communication system. The satellite 160 may be an example of a space satellite, a balloon, a dirigible, an airplane, a drone, an unmanned aerial vehicle, and/or the like. In some examples, the satellite 160 may be in a geosynchronous or geostationary earth orbit, a LEO system, a MEO system, etc. A satellite 160 may be a multi-beam satellite configured to provide service for multiple service beam coverage areas in a predefined geographical service area. The satellite 160 may be any distance away from the surface of the earth.

In some cases, a cell may be provided or established by a satellite 160 as part of a non-terrestrial network. A satellite 160 may, in some cases, perform the functions of a base station 105, act as a bent-pipe satellite, or may act as a regenerative satellite, or a combination thereof. In other cases, the satellite 160 may be an example of a smart satellite, or a satellite with intelligence. For example, a smart satellite may be configured to perform more functions than a regenerative satellite (e.g., may be configured to perform particular algorithms beyond those used in regenerative satellites, to be reprogrammed, etc.). A bent-pipe transponder or satellite may be configured to receive signals from ground stations and transmit those signals to different ground stations. In some cases, a bent-pipe transponder or satellite may amplify signals or shift from uplink frequencies to downlink frequencies. A regenerative transponder or satellite may be configured to relay signals like the bent-pipe transponder or satellite, but may also use on-board processing to perform other functions. Examples of these other functions may include demodulating a received signal, decoding a received signal, re-encoding a signal to be transmitted, or modulating the signal to be transmitted, or a combination thereof. For example, a bent-pipe satellite (e.g., a satellite 160) may receive a signal from a base station 105 and may relay the signal to a UE 115 or the base station 105, or vice-versa. In accordance with one or more aspects of the present disclosure, a UE 115 may communicate with a cell provided or established by a satellite 160 (e.g., via a base station 105 or a satellite 160 performing the functions of a base station 105) according to an identified default set of one or more beams based on an inactivity timer expiring, which may enhance communications reliability.

Due to high mobility and limited beam coverage, for example, for satellites 160 in LEO systems, MEO systems, GNSS, and other non-terrestrial as well as terrestrial systems, the UEs 115 may attempt to select a different beam or coverage area when communicating with a satellite 160. However, the UEs 115 may not be configured or have information regarding the satellite's 160 beam configuration (e.g., beam coverage areas, etc.), which may negatively impact the beam selection operation for the UEs 115. The UEs 115 may include a UE communications manager 101 that may manage beam coverage area representations as described herein. The UE communications manager 101 may be an example of aspects of a UE communications manager as described in FIGS. 6 through 9. Similarly, the base stations 105 may include a base station communications manager 102 that may manage beam coverage area representations as described herein. The base station communications manager 102 may be an example of aspects of a base station communications manager as described in FIGS. 10 through 13.

Various aspects of the described techniques relate to the UEs 115 having knowledge of the beam configuration for each beam's coverage area (e.g., beam footprint) to assist with the beam selection operation. In order to improve reliability and reduce latency related to beam selection for beamformed communications with a satellite 160, the UEs 115 may be preconfigured with the beam configuration. Alternatively, the UEs 115 may be configured to receive the beam configuration from a network device (e.g., a base station 105, a gateway device) via a broadcast message, such as a system information message or an RRC message. The beam configuration may include beam position information (e.g., coordinates for a center of each of the beam coverage areas) and beam classification information (e.g., a shape, a size, and/or an orientation of each beam). The UEs 115 may also be configured with beam frequency association information that links each of the beam coverage areas with a frequency interval, which could be in the form of a bandwidth part. As a result, the UEs 115 may support efficient beam selection operation for beamformed communications using the information in the beam configuration.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode). A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs. The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $\Delta f_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation. A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band. With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Figure 2:
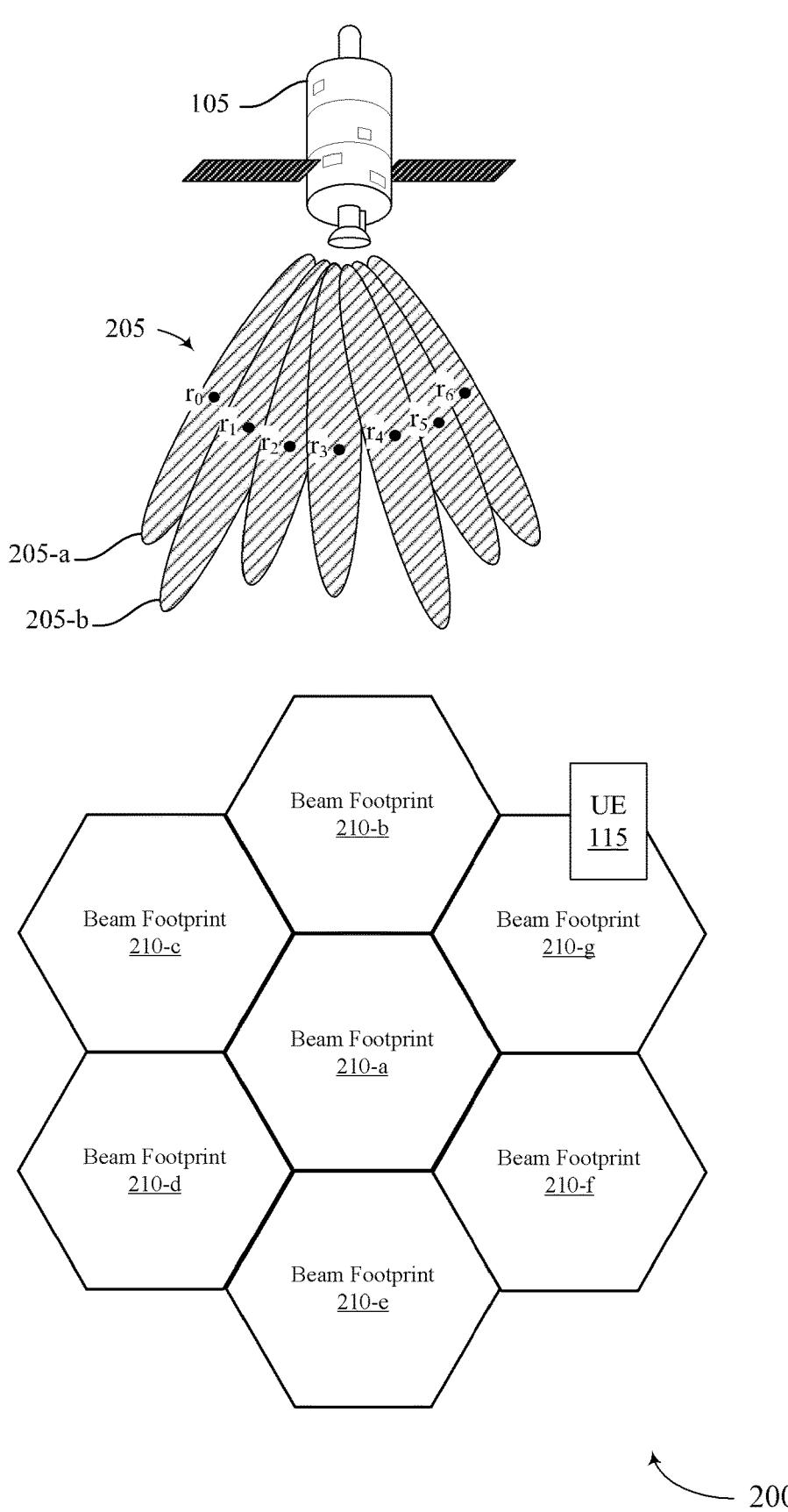

FIG. 2 illustrates an example of a wireless communications system 200 that supports managing beam coverage area representations in wireless communications systems in accordance with one or more aspects of the present disclosure. The wireless communications system 200 may implement aspects of the wireless communications system 100. For example, the wireless communications system 200 may be a non-terrestrial communications system or a terrestrial communications system, or a combination therefore. The wireless communications system 200 may include a base station 105 and a UE 115. The base station 105 and the UE 115 may be examples of a base station 105 (also referred to as a non-terrestrial node) and a UE 115 as described with reference to FIG. 1. For example, the base station 105 may be a satellite or a gateway physically located on the satellite, or distributed such that portions of functions are implemented at different physical locations. In some examples, the wireless communications system 200 may support multiple radio access technologies including 4G systems such as LTE systems, LTE-A systems, or LTE-A Pro systems, and 5G systems which may be referred to as NR systems.

The base station 105 and the UE 115 may be configured with multiple antennas, which may be used to employ techniques such as transmit diversity, receive diversity, multiple-input multiple-output communications, or beamforming, or any combination thereof. The antennas of the base station 105 and the UE 115 may be located within one or more antenna arrays or antenna panels, which may support multiple-input multiple-output operations or transmit or receive beamforming. For example, the base station 105 antennas or antenna arrays may be co-located at an antenna assembly, such as an antenna tower. In some examples, antennas or antenna arrays associated with the base station 105 may be located in diverse geographic locations. The base station 105 may have an antenna array with a number of rows and columns of antenna ports that the base station 105 may use to support beamforming of communications with the UE 115. Likewise, the UE 115 may have one or more antenna arrays that may support various multiple-input multiple-output or beamforming operations. The base station 105 and the UE 115 may thus be configured to support beamformed communications (e.g., downlink and uplink beamformed transmissions) using the multiple antennas.

The base station 105 and the UE 115 may support beamformed communications using multiple component carriers. For example, the base station 105 and the UE 115 may be configured to support multiple downlink component carriers and multiple uplink component carriers. The base station 105 and the UE 115 may be configured to support the beamformed communications over a carrier bandwidth or may be configured to support the beamformed communications over one of multiple carrier bandwidths. A carrier used for beamformed communications may include a portion of a radio frequency spectrum band (for example, a bandwidth part). The base station 105 and the UE 115 may thereby support beamformed communications using one or more directional beams 205 using one or more component carriers.

The one or more directional beams 205 of the base station 105 may form a geographic coverage area over which the base station 105 and the UE 115 may support the beamformed communications according to one or more radio access technologies. The geographic coverage area may be a beam footprint 210 corresponding to one or more directional beams 205 configured at the base station 105 for communicating with the UE 115. For example, the base station 105 may use multiple antennas to form the one or more directional beams 205 (e.g., narrow beams) for beamformed communication with the UE 115. The directional beams 205 may operate on different frequency intervals (e.g., different BWPs) to reduce interference among the directional beams 205. That is, a directional beam 205-*a* may operate using different BWPs than a directional beam 205-*b*. In some examples, the base station 105 may configure the one or more directional beams 205 as a single cell. In some other examples, the base station 105 may configure the one or more directional beams 205 as separate cells.

The base station 105 and the UE 115 may be thousands of kilometers apart and it may take some time for electromagnetic waves to propagate over a distance between the base station 105 and the UE 115. The propagation delay for non-terrestrial networks may be many orders of magnitude larger than the propagation delay for terrestrial networks. By way of example, the base station 105 may be in an orbit, such as LEO system, MEO system, other non-geostationary earth orbit, or geostationary earth orbit. In any of these examples, the base station 105 may be many thousands of kilometers from earth, and therefore may be thousands of kilometers from the UE 115. Each beamformed transmission between the base station 105 and the UE 115 may therefore travel from earth the distance to the base station 105 and back to earth. The distance that a beamformed transmission travels may result in substantial signal degradation due to, for example, atmospheric effects, interference from other radio frequency sources, signal attenuation due to vegetation or structures, and the like.

Further, due to high mobility and limited beam coverage (e.g., for satellites in a LEO system), the UE 115 may attempt to select a different directional beam 205 or coverage area when communicating with the base station 105. For example, due to the high mobility of the UE 115 relative to the base station 105, the UE 115 may frequently switch between directional beams 205. For example, the UE 115 may perform a beam switching operation to switch from a directional beam 205-*a* to a directional beam 205-*b*. However, the UE 115 may not be configured or have information regarding the base station 105 beam configuration (e.g., beam coverage areas, etc.), which may negatively impact the beam selection operation for the UE 115.

Various aspects of the described techniques relate to the UE 115 having knowledge of the beam configuration for each beam's coverage area (e.g., beam footprint) to assist with the beam selection operation. In order to improve reliability and reduce latency related to beam selection for beamformed communications with the base station 105, the UE 115 may be preconfigured with the beam configuration. Alternatively, the UE 115 may be configured to receive the beam configuration from a network device (e.g., a base station, a gateway device) via a broadcast message, such as a system information message or an RRC message. The beam configuration may include beam position information (e.g., coordinates for a center of each of the beam coverage areas) and beam classification information (e.g., a shape, a size, and/or an orientation of each beam). The orientation may be the angle from a predefined line segment of the beam footprint 210 to the satellite motion direction. The UE 115 may also be configured with beam frequency association information that links each of the beam coverage areas with a frequency interval, which could be in the form of a bandwidth part. As a result, the UE 115 may support efficient beam selection operation for beamformed communications using the information in the beam configuration.

The UE 115 may determine a beam configuration associated with the directional beams 205 of the base station 105 (e.g., a regenerative satellite or a bent-pipe satellite). The beam configuration may include an indication whether a reference beam is used. The beam configuration may include a set of identifiers associated with the set of directional beams 205. For example, the set of identifiers may include synchronization signal block (SSB) indices or cell identifiers, which may be used as beam identifiers, in some examples, of the directional beams 205 associated with the base station 105. The UE 115 may determine beam position information associated with a beam footprint 210 of each directional beam 205 based on the beam configuration. In some examples, the UE 115 may determine position coordinates of a center of each beam footprint 210 of each directional beam 205 of the set of directional beams, which may be as a function of time. In some other examples, the UE 115 may determine a set of position coordinates associated with a boundary of each beam footprint 210 of each directional beam 205 of the set of directional beams. That is, the UE 115 may determine coordinates of a number of points on a boundary (e.g., a contour of a half power main lobe) of a directional beam 205.

The UE 115 may also determine beam classification information associated with each beam footprint 210 of each directional beam 205 of the set of directional beams based on the beam configuration. In some examples, the UE 115 may determine a shape of each beam footprint 210 of each directional beam 205. The shape of a beam footprint 210 may, for example, include an ellipse shape, a circle shape, or a hexagon shape (e.g., as a convenient representation of isotropic beam footprints), or any combination thereof. In some examples, a respective beam footprint 210 of two or more directional beams 205 may have a same shape. For example, a beam footprint 210-*a* associated with the directional beam 205-*a* may be an ellipse shape. Likewise, a beam footprint 210-*b* associated with the directional beam 205-*b* may be an ellipse shape. In some other examples, a respective beam footprint 210 of two or more directional beams 205 may have different shapes. For example, the beam footprint 210-*a* associated with the directional beam 205-*a* may be an ellipse shape, while the beam footprint 210-*b* associated with the directional beam 205-*b* may be a hexagon shape. The UE 115 may, in some examples, derive a beam footprint shape (e.g., an ellipse shape, a circle shape, or a hexagon shape, or any combination thereof) based on the one or more beamforming weights associated with the directional beams 205. The UE 115 may, in some examples, derive a beam footprint shape (e.g., an ellipse shape, a circle shape, or a hexagon shape, or any combination thereof) based on the shape and structure of the antenna associated with the directional beams 205. In other examples, the UE 115 may derive a beam size based on one or more power levels associated with the directional beams 205. The shape and size of the beam footprints 210 may depend on a distance between the base station 105 from the surface of the earth, a transmitting angle, and the like. Further, the beam footprints 210 that are adjacent may have different shapes and sizes dependent on the transmission angle and distance of the base station 105. A beam footprint shape, for example, associated with the base station 105 (e.g., a satellite) may be determined by a single antenna—a horn antenna, as opposed to multiple whip or patch antennas. The horn antenna may have different shapes and structures and that affect the beam footprint shape. In some cases, footprints 220 may overlap. In some examples, the UE 115 may determine a size of each beam footprint 210 of each directional beam 205. The size of each beam footprint 210 corresponds to a semi-major axis associated with each directional beam 205 or a semi-minor axis associated with each directional beam 205, or both. In some other examples, the UE 115 may determine an orientation of each beam footprint 210 of each directional beam 205.

In some examples, the UE 115 may determine beam position information (e.g., position coordinates of a center of a beam footprint) and beam classification information (e.g., a shape, a size, and an orientation) of a reference directional beam 205. For example, the UE 115 may determine that the directional beam 205-*a* is a reference directional beam based on the beam configuration, and determine position coordinates of a center of the beam footprint 210-*a* of the reference directional beam (i.e., the directional beam 205-*a*). The other beam footprints 210-*b* through 210-*g* may be derived from the reference beam footprint 210-*a*, as described herein.

Figure 3:
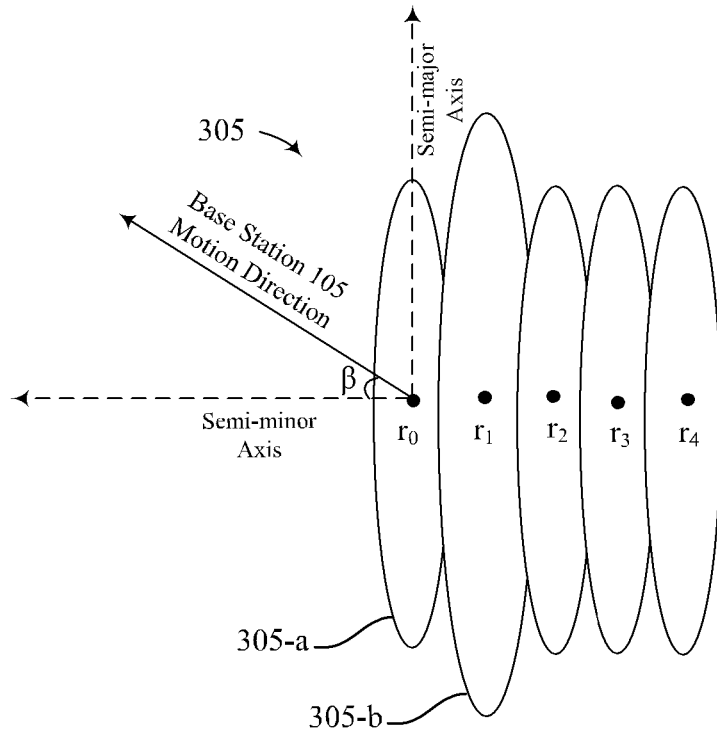
FIGS. 3 through 5 illustrate examples of beam footprint diagrams that support managing beam coverage area representations in wireless communications systems in accordance with one or more aspects of the present disclosure.

FIG. 3 illustrates an example of a beam footprint diagram 300 that supports managing beam coverage area representations in wireless communications systems in accordance with one or more aspects of the present disclosure. The beam footprint diagram 300 may implement aspects of the wireless communications system 100 and the wireless communications system 200 described with reference to FIGS. 1 and 2, respectively. The beam footprint diagram 300 may be based on a configuration by a base station 105 and implemented by a UE 115 to promote power saving for the UE 115 by supporting beam coverage area operations. The beam footprint diagram 300 may also be based on a configuration by the base station 105 and implemented by a UE 115 to promote high reliability and low latency beamformed communications, among other benefits.

In the example of FIG. 3, the beam footprint diagram 300 may be associated with a base station 105, which may be a satellite or a relay physically located on the satellite, or distributed such that portions of functions are implemented at different physical locations. The beam footprint diagram 300 may include a number of beam footprints 305, which may be examples of beam footprints 210 as described in FIG. 2, respectively. In the example of FIG. 3, the beam footprints 305 may have an ellipse shape. In some other examples, the beam footprints 305 may have different shapes, for examples, a circle shape, a hexagon shape, or the like. The UE 115 may determine a beam footprint 305-*a* is a reference beam footprint, for example, based on a beam configuration. The reference beam footprint 305-*a* may also be associated with a reference directional beam. The direction of motion of a base station 105 may be represented by an angle β with respect to the semi-minor axis of the beam footprint 305-*a*. The UE 115 may derive other beam footprints 305 by scaling the reference beam footprint 305-*a* by a factor value. For example, the UE 115 may derive a beam footprint 305-*b* by scaling the reference beam footprint 305-*a* by factor of 1.4. Other beam footprints 305 may be identical to that of the reference beam footprint 305-*a*.

Figure 4:
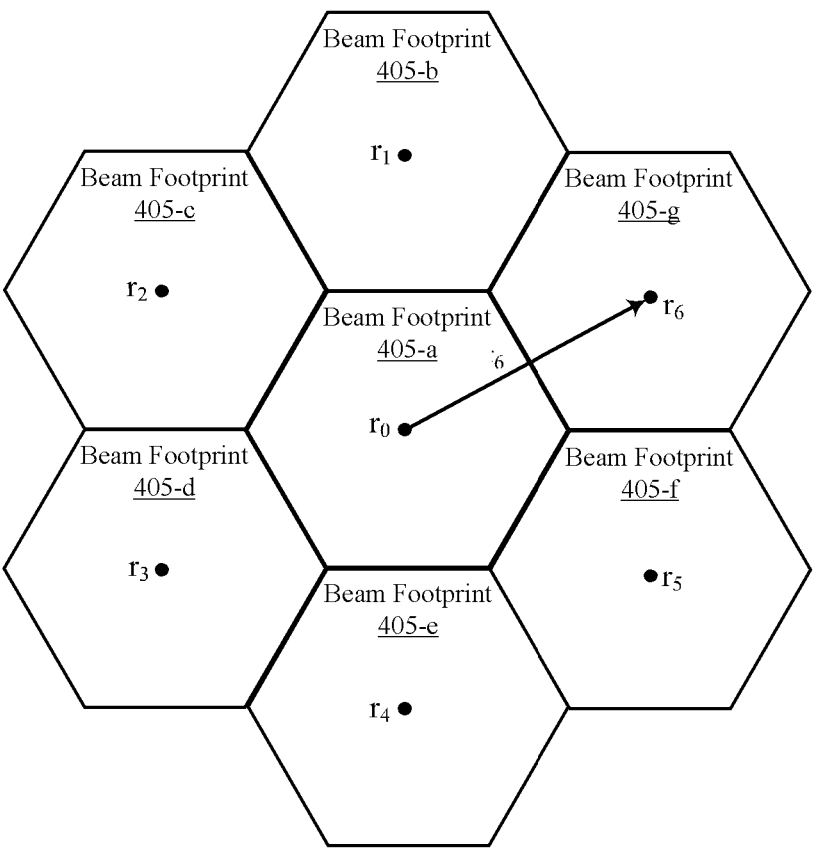

FIG. 4 illustrates an example of a beam footprint diagram 400 that supports managing beam coverage area representations in wireless communications systems in accordance with one or more aspects of the present disclosure. The beam footprint diagram 400 may implement aspects of the wireless communications system 100 and the wireless communications system 200 described with reference to FIGS. 1 and 2, respectively. The beam footprint diagram 400 may be based on a configuration by a base station 105 and implemented by a UE 115 to promote power saving for the UE 115 by supporting beam coverage area operations. The beam footprint diagram 400 may also be based on a configuration by the base station 105 and implemented by a UE 115 to promote high reliability and low latency beamformed communications, among other benefits.

In the example of FIG. 4, the beam footprint diagram 400 may be associated with a base station 105, which may be a satellite or a gateway physically located on the satellite, or distributed such that portions of functions are implemented at different physical locations. The beam footprint diagram 400 may include a number of beam footprints 405-*a* through 405-*g*, which may be examples of beam footprints as described in FIGS. 2 and 3, respectively. In some examples, all the beam footprints 405-*a* through 405-*g* may be configured as a single cell (e.g., a single geographic coverage area) over which the base station 105 and a UE 115 may support beamformed communications according to one or more radio access technologies. In some other examples, each beam footprint 405-*a* through 405-*g* may be configured as a separate cell over which the base station 105 and a UE 115 may support beamformed communications according to one or more radio access technologies.

For example, beam footprint 405-*a* may form a first cell (e.g., a first geographic coverage area), beam footprint 405-*b* may form a second cell (e.g., a second geographic coverage area), beam footprint 405-*c* may form a third cell (e.g., a third geographic coverage area), beam footprint 405-*d* may form a fourth cell (e.g., a fourth geographic coverage area), beam footprint 405-*e* may form a fifth cell (e.g., a fifth geographic coverage area), beam footprint 405-*f* may form a sixth cell (e.g., a sixth geographic coverage area), and beam footprint 405-*g* may form a seventh cell (e.g., a seventh geographic coverage area) over which the base station 105 and the UE 115 may support beamformed communications according to one or more radio access technologies.

Additionally, each beam footprint 405-*a* through 405-*g* may be associated with a separate directional beam. For example, beam footprint 405-*a* may be associated with a first directional beam (e.g., beam 1), beam footprint 405-*b* may be associated with a second directional beam (e.g., beam 2), beam footprint 405-*c* may be associated with a third directional beam (e.g., beam 3), beam footprint 405-*d* may be associated with a fourth directional beam (e.g., beam 4), beam footprint 405-*e* may be associated with a fifth directional beam (e.g., beam 5), beam footprint 405-*f* may be associated with a sixth directional beam (e.g., beam 6), and beam footprint 405-*g* may be associated with a seventh directional beam (e.g., beam 7) over which the base station 105 and the UE 115 may support beamformed communications according to one or more radio access technologies.

The UE 115 may identify each directional beam associated with each of the beam footprints 405-a through 405-g based on an identifier of the base station 105 and a beam identifier associated with each directional beam. Each directional beam of the set of directional beams may correspond to a separate beam identifier (e.g., separate beam index). For example, a first directional beam (e.g., beam 1) may be associated with a first beam index (e.g., beam index 1), while a second directional beam (e.g., beam 2) of the set may be associated with a second beam index (e.g., beam index 2), etc.

With reference to FIG. 4, as part of determining beam position information, the UE 115 may determine position coordinates of a center of a coverage area of a reference directional beam. For example, the UE 115 may determine position coordinates $r_0$ of a center of the beam footprint 405-a, which may be associated with a reference directional beam (e.g., beam 0). In some examples, the UE 115 may determine the position coordinates $r_0$ of the center of the beam footprint 405-a as a function of time. The UE 115 may also determine relative location (e.g., vector $x_6$) of a center of every other beam footprint 405-b through 405-g. For example, the UE 115 may derive a center of the beam footprint 405-g based on the position coordinates $r_0$ of the center of the beam footprint 405-a and a relative location (vector $x_6$) of a center of the beam footprint 405-g. The UE 115 may determine the center of the beam footprint 405-g according to the following expression: $r_6=r_0+x_6$. Likewise, the UE 115 may determine the center of the other beam footprints 405 according to the following: $r_1=r_0+x_i$, where $x_i$ is the relative location vector of a center of a beam footprint 405. The coordinates of the centers are: $r_i$, where i=0, 1, . . . , 6.

Figure 5:
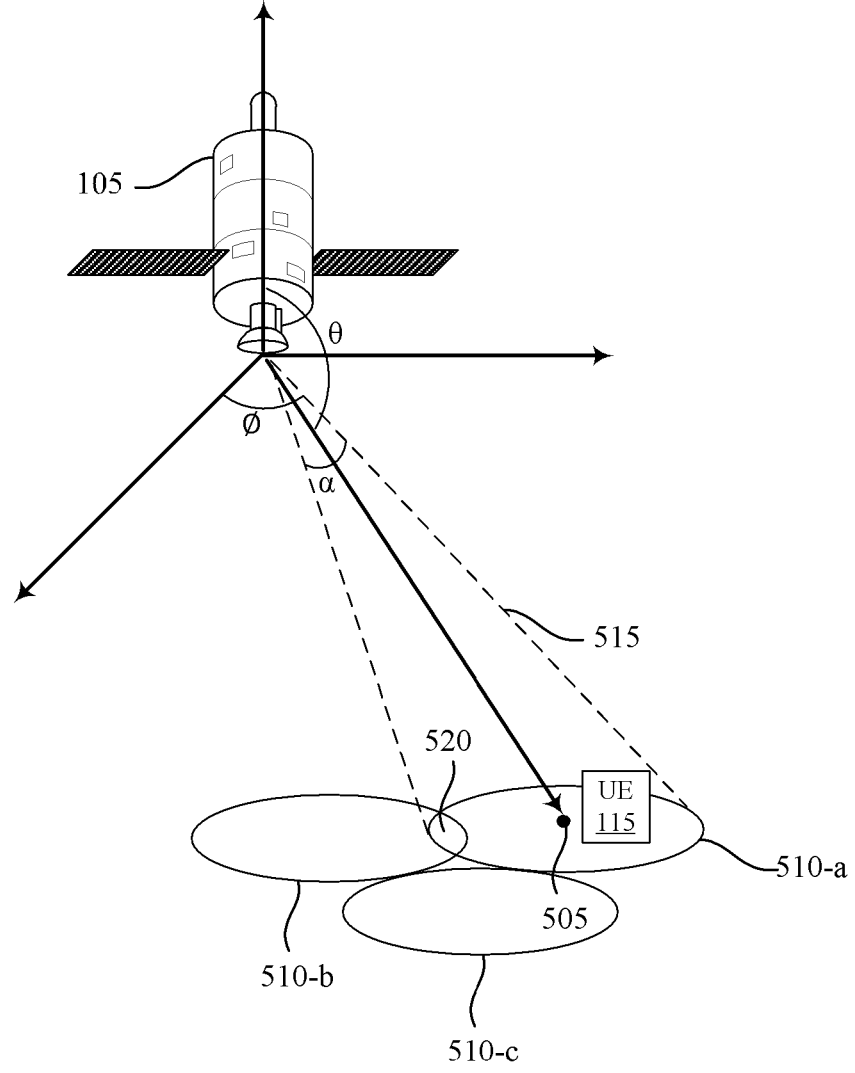

FIG. 5 illustrates an example of a beam footprint diagram 500 that supports managing beam coverage area representations in wireless communications systems in accordance with one or more aspects of the present disclosure. The beam footprint diagram 500 may implement aspects of the wireless communications system 100 and the wireless communications system 200 described with reference to FIGS. 1 and 2, respectively. The beam footprint diagram 500 may be based on a configuration by a base station 105 and implemented by a UE 115 to promote power saving for the UE 115 by supporting beam coverage area operations. The beam footprint diagram 500 may also be based on a configuration by the base station 105 and implemented by a UE 115 to promote high reliability and low latency beamformed communications, among other benefits.

In the example of FIG. 5, the base station 105 may be a satellite or a gateway physically located on the satellite, or distributed such that portions of functions are implemented at different physical locations. The UE 115 may determine position coordinates of a center of a coverage area of a directional beam based on a direction of a center of a coverage area of a directional beam, a width of a directional beam, or a height associated with the base station 105, or any combination thereof. For example, the UE 115 determine position coordinates of a center 505 (also referred to as a beam center) of a beam footprint 510-a of a directional beam 515 based on a direction of the center 505 of the beam footprint 510-a of the directional beam 515, a width of the directional beam 515, or a height associated with the base station 105 (e.g., an altitude of a satellite), or any combination thereof. The beam footprints 510 may be examples of beam footprints as described in FIGS. 2 through 4, respectively. In some examples, the beam footprint 510-a may partially overlap 520 with a beam footprint 510-b. In some other examples, the beam footprint 510-a may not overlap with a beam footprint 510. For example, the beam footprint 510-a may not overlap with a beam footprint 510-c. The direction of the center 505 of the beam footprint 510-a of the directional beam 515 can be represented by at least two angles, for example, an azimuth angle and a zenith angle (e.g., $\phi$, $\theta$) shown in FIG. 5). The azimuth angle and the zenith angle (e.g., $\phi$, $\theta$)) may be a function of time to represent beam steering by the base station 105. The width of the directional beam 515 may be represented by a solid angle (e.g., $\alpha$ shown in FIG. 5). The UE 115 may thereby derive position coordinates of a center of a beam footprint using the beam direction, the beam width, and an altitude of a base station (e.g., a satellite) to support efficient beam switching operations for beamformed communications.

Figure 6:
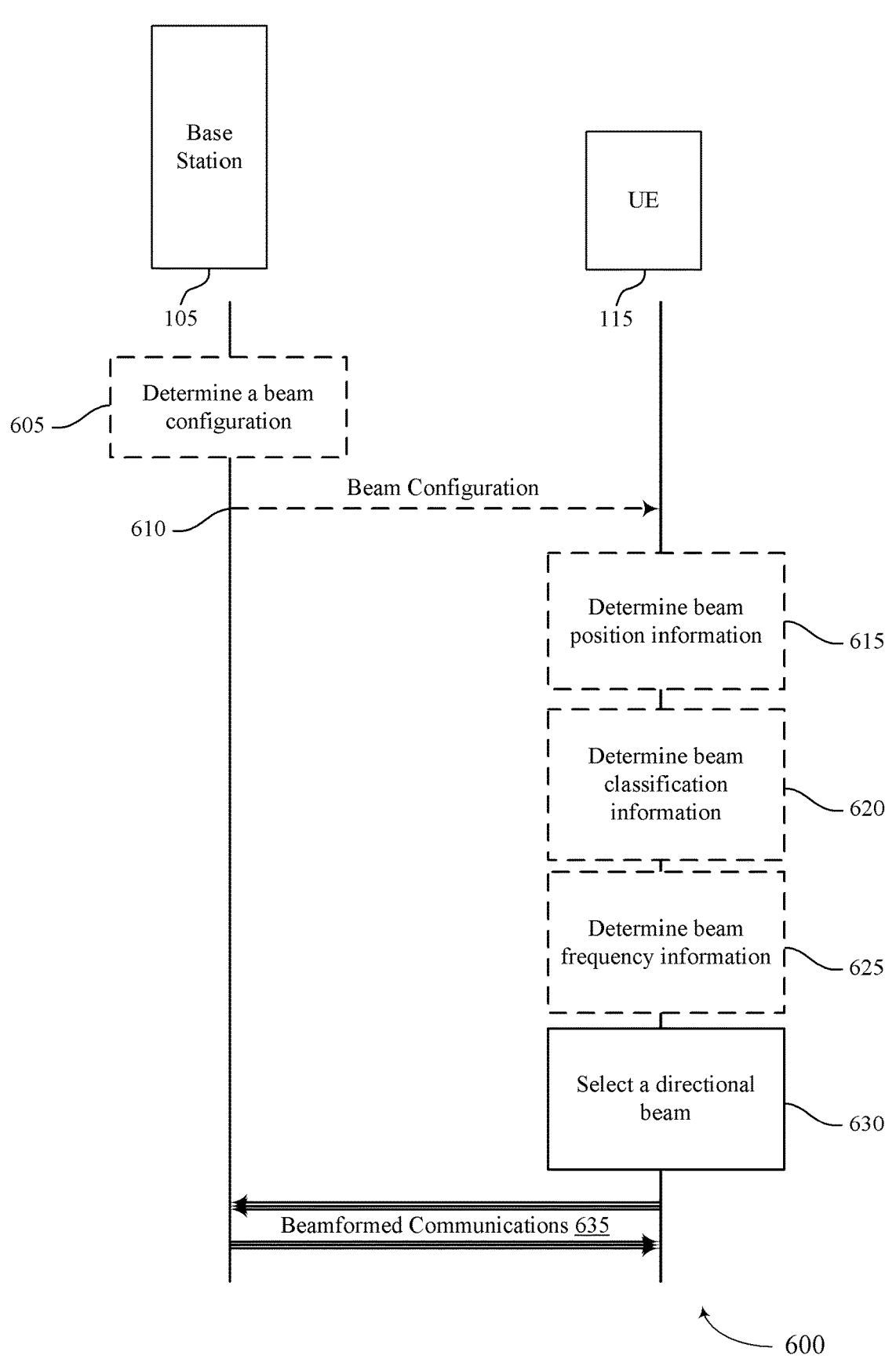
FIG. 6 illustrates an example of a process flow that supports managing beam coverage area representations in wireless communications systems in accordance with one or more aspects of the present disclosure.

FIG. 6 illustrates an example of a process flow 600 that supports managing beam coverage area representations in wireless communications systems in accordance with one or more aspects of the present disclosure. The process flow 600 may implement aspects of the wireless communications system 100 and the wireless communications system 200 described with reference to FIGS. 1 and 2, respectively. The process flow 600 may be based on a configuration by a base station 105 and implemented by a UE 115 to promote power saving for the UE 115 by supporting beam coverage area operations. The process flow 600 may also be based on a configuration by the base station 105 and implemented by the UE 115 to promote high reliability and low latency beamformed communications, among other benefits.

The base station 105 and the UE 115 may be examples of a base station 105 and a UE 115, as described herein. For example, the base station 105 may be a non-terrestrial base station (e.g., a regenerative satellite) or a non-terrestrial relay station (e.g., a bent-pipe satellite) in a LEO system, a MEO system, or part of a GNSS. In the following description of the process flow 600, the operations between the base station 105 and the UE 115 may be transmitted in a different order than the example order shown, or the operations performed by the base station 105 and the UE 115 may be performed in different orders or at different times. Some operations may also be omitted from the process flow 600, and other operations may be added to the process flow 600.

In the example of FIG. 6, the base station 105 and the UE 115 may be part of a non-terrestrial wireless communications system or a terrestrial wireless communications system, or both. For example, the base station 105 may be a satellite and part of the non-terrestrial wireless communications system, while the UE 115 may be part of the terrestrial wireless communications system. Both the base station 105 and the UE 115 may communicate with each other via beamformed communications using one or more directional beams. In a non-terrestrial wireless communications system, the base station 105 (e.g., a satellite) may use multiple antennas to form multiple directional beams, and the directional beams may operate on separate frequency intervals (e.g., different bandwidth parts) to mitigate interference between the directional beams. The directional beams from the base station 105 (e.g., a satellite) may be configured as a single cell, as described with reference to FIGS. 1 through 5. Alternatively, each directional beam from the base station 105 (e.g., a satellite) may be configured as a separate cell.

Due to high mobility and limited beam coverage (e.g., for satellites in low-earth orbit), the UE 115 may, in some cases, attempt to select a different directional beam or coverage area when communicating with the base station 105. However, the UE 115 may not be configured or have information regarding the base station 105 beam configuration (e.g., beam coverage areas, etc.), which may negatively impact the directional beam selection operation for the UE 115. It may be beneficial for the UE 115 to have knowledge of the beam configuration for each directional beam's coverage area (also referred to as beam footprint) to assist with the directional beam selection operation.

At 605, the base station 105 may determine a beam configuration associated with a set of directional beams of the base station 105. The beam configuration may include an identifier of the base station 105 and a set of identifiers associated with the set of directional beams. Each directional beam of the set of directional beams may correspond to a separate beam identifier (e.g., separate beam index). For example, a first directional beam of the set may be associated with a first beam index, while a second directional beam of the set may be associated with a second beam index, etc. The base station 105 may, in some examples, determine beam position information associated with a coverage area (i.e., a footprint) of each directional beam of the set of directional beams. For example, the base station 105 may determine position coordinates of a center of each coverage area of each directional beam of the set of directional beams. In some examples, the base station 105 may determine the position coordinates of the center of each coverage area of each directional beam as a function of time. The base station 105 may determine a set of position coordinates associated with a boundary of each coverage area of each directional beam of the set of directional beams. The beam configuration may thus include the beam position information (e.g., beam coordinates for a center of each beam footprint) associated with the coverage area of each directional beam of the set of directional beams.

The base station 105 may, additionally or alternatively, determine beam classification information associated with a coverage area (i.e., a footprint) of each directional beam of the set of directional beams. The base station 105 may, in some examples, determine a shape of the coverage area of each directional beam of the set of directional beams. The shape of the coverage area may be an ellipse shape, a circle shape, or a hexagon shape, or any combination thereof. In some examples, the base station 105 may determine a size of the coverage area of each directional beam of the set of directional beams. The size of the coverage area may correspond to a semi-major axis associated with each directional beam or a semi-minor axis associated with each directional beam, or both. In some other examples, the base station 105 may determine an orientation of the coverage area of each directional beam of the set of directional beams. In other examples, the base station 105 may determine a direction of a center of the coverage area of each directional beam of the set of directional beams. The direction may be an azimuth angle or a zenith angle, or both. The beam configuration may thus include the beam classification information (e.g., a beam geometry of each directional beam) associated with the coverage area of each directional beam of the set of directional beams.

The base station 105 may also determine beam frequency information of each directional beam of the set of directional beams. For example, each directional beam of the set of directional beams operates in a separate frequency interval. Alternatively, each directional beam of the set of directional beams operates in a separate bandwidth part. At 610, the base station 105 may transmit the beam configuration to the UE 115. It may be beneficial to have neighboring directional beams operate in different frequency intervals to mitigate interference. In some examples, an initial beam-frequency association may be configured at a time of cell search by the UE 115. In some other examples, the UE 115 may determine a new beam-frequency association after the UE 115 camps on a cell of the base station 105 (e.g., to mitigate interference between satellites).

In some examples, the base station 105 may transmit the beam configuration to the UE 115 in a system information message, for example, a SIB. In some other examples, the base station 105 may transmit the beam configuration to the UE 115 in an RRC message, for example, an RRC configuration message. In some examples, the UE 115 may be preconfigured with the beam configuration. For example, the beam configuration may be installed on the UE 115 during manufacturing, or downloaded from the Internet and installed (e.g., stored) to the UE 115 by a client user or a network operator. The beam configuration may thereby provide a beam footprint map including beam position information, beam classification information (e.g., shape and size of each beam and an identifier of the base station 105 (e.g., a satellite)), or the beam frequency association, or a combination thereof.

At 615, the UE 115 may determine beam position information, for example, associated with a coverage area of each directional beam of a set of directional beams based on the beam configuration. For example, as described herein, the UE 115 may determine position coordinates for a center of each coverage area (i.e., beam footprint) of each directional beam of the set of directional beams. At 620, the UE 115 may determine beam classification information, for example, associated with a coverage area of each directional beam of a set of directional beams based on the beam configuration. For example, as described herein, the UE 115 may determine beam geometry, such as a shape, size and orientation of each coverage area (i.e., beam footprint) of each directional beam of a set of directional beams. At 625, the UE 115 may determine beam frequency information, for example, associated with a coverage area of each directional beam of a set of directional beams based on the beam configuration. At 630, the UE 115 may select a directional beam, for example, from the set of directional beams based on the beam position information, the beam classification information, or the beam frequency information, or a combination thereof. The selected directional beam may satisfy one or more thresholds (e.g., a signal strength threshold), such that the UE 115 may experience high reliability and low latency beamformed communications with the base station 105. For example, the selected directional beam may satisfy a reference signal received power (RSRP) threshold, a received signal received quality (RSRQ) threshold, or the like. At 535, the base station 105 and the UE 115 may perform beamformed communications (e.g., downlink and uplink beamformed transmissions).

Figure 7:
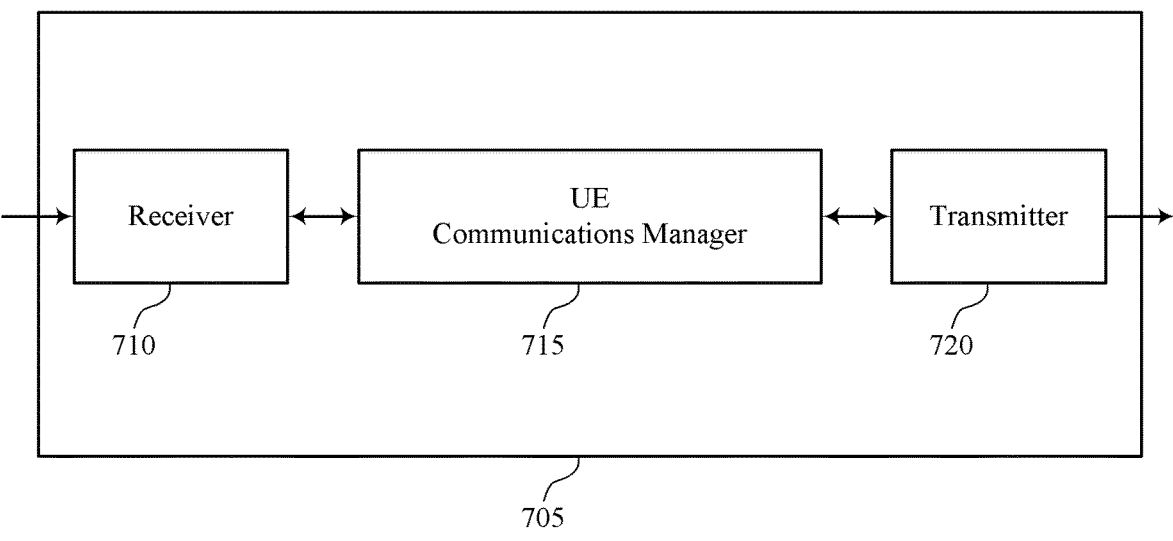
FIGS. 7 and 8 show block diagrams of devices that support managing beam coverage area representations in wireless communications systems in accordance with one or more aspects of the present disclosure.

FIG. 7 shows a block diagram 700 of a device 705 that supports managing beam coverage area representations in wireless communications systems in accordance with one or more aspects of the present disclosure. The device 705 may be an example of aspects of a UE 115 as described herein. The device 705 may include a receiver 710, a UE communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to beam footprints, etc.). Information may be passed on to other components of the device 705. The receiver 710 may be an example of aspects of the transceiver 1020 described with reference to FIG. 10. The receiver 710 may utilize a single antenna or a set of antennas.

The UE communications manager 715 and/or one or more components of the UE communications manager 715 may perform and/or be a means for performing, either alone or in combination with other elements, one or more operations for managing beam coverage area representations in wireless communications systems. The UE communications manager 715 may determine a beam configuration associated with a set of directional beams of a base station. The beam configuration including a set of identifiers associated with the set of directional beams. The UE communications manager 715 may determine beam position information associated with a coverage area of each directional beam of the set of directional beams based on the beam configuration. The UE communications manager 715 may determine beam classification information associated with the coverage area of each directional beam of the set of directional beams based on the beam configuration. The UE communications manager 715 may select a directional beam of the set of directional beams based on the beam position information and the beam classification information, and communicate with the base station using the directional beam. The UE communications manager 715 may be an example of aspects of the UE communications manager 1010 described herein.

The UE communications manager 715 may be implemented as an integrated circuit or chipset for the device 705 modem, and the receiver 710 and the transmitter 720 may be implemented as analog components (for example, amplifiers, filters, antennas) coupled with the device 705 modem to enable beamformed transmission and reception. The UE communications manager 715 may be implemented to realize one or more potential improvements. The UE communications manager 715 may enable the device 705 to determine beam position information of one or more directional beams for beamformed communications. In some implementations, the UE communications manager 715 may enable the device 705 to determine beam classification information of one or more directional beams for beamformed communications. In some other implementations, the UE communications manager 715 may enable the device 705 to determine beam frequency information of one or more directional beams for beamformed communications. Based on implementing the beam position information, the beam classification information, or the beam frequency information, or a combination thereof, one or more processors of the device 705 (for example, processor(s) controlling or incorporated with the UE communications manager 715) may experience reduce power consumption and promote high reliability and low latency beamformed communications (for example, downlink and uplink beamformed transmissions), among other benefits.

The UE communications manager 715, or its sub-components, may be implemented in hardware, code (e.g., software or firmware) executed by a processor, or any combination thereof. If implemented in code executed by a processor, the functions of the UE communications manager 715, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The UE communications manager 715, or its sub-components, may be physically located at various positions, including being distributed such that portions of functions are implemented at different physical locations by one or more physical components. In some examples, the UE communications manager 715, or its sub-components, may be a separate and distinct component in accordance with various aspects of the present disclosure. In some examples, the UE communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver component. For example, the transmitter 720 may be an example of aspects of the transceiver 1020 described with reference to FIG. 10. The transmitter 720 may utilize a single antenna or a set of antennas.

Figure 8:
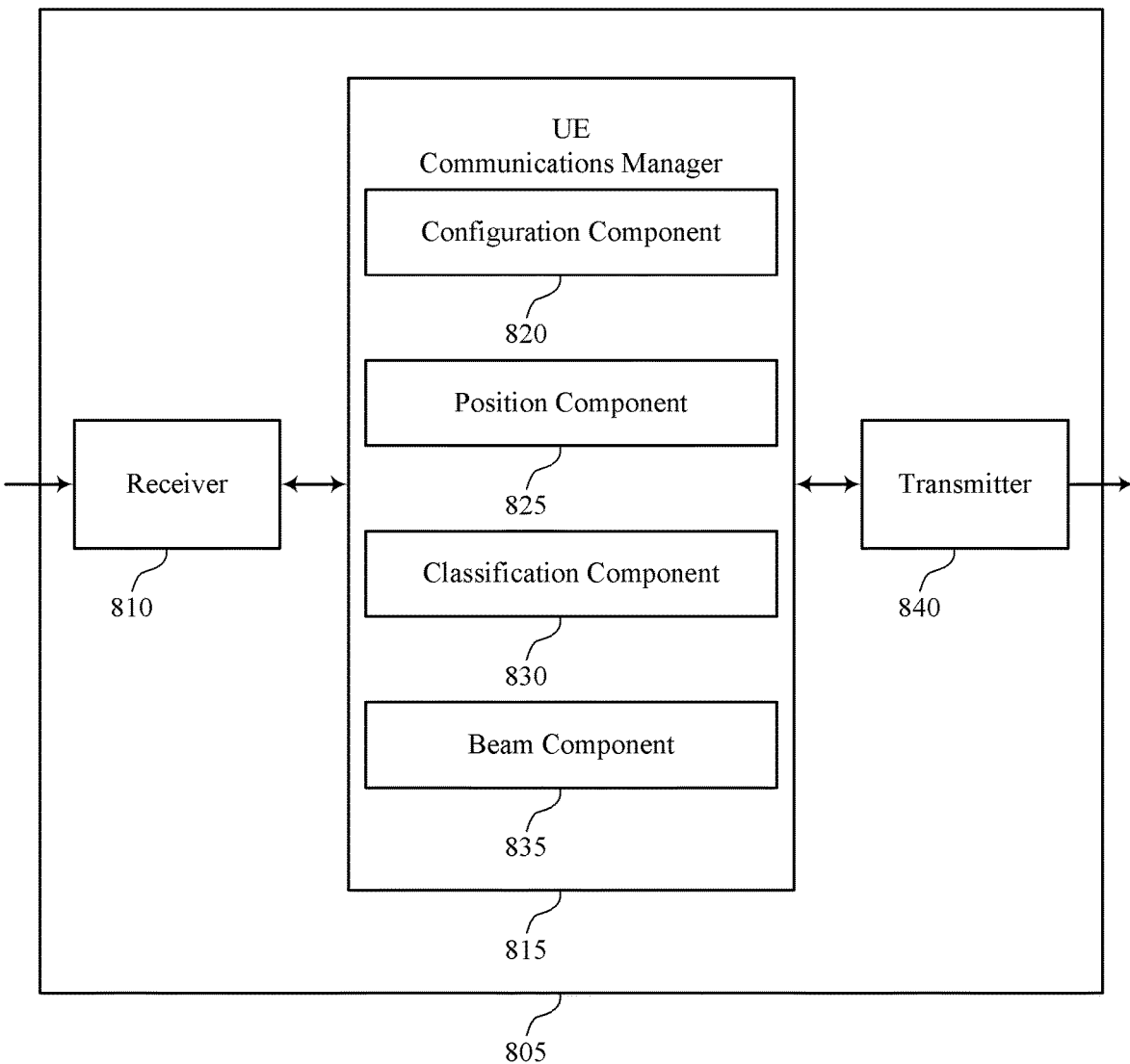

FIG. 8 shows a block diagram 800 of a device 805 that supports managing beam coverage area representations in wireless communications systems in accordance with one or more aspects of the present disclosure. The device 805 may be an example of aspects of a device 705, or a UE 115 as described herein. The device 805 may include a receiver 810, a UE communications manager 815, and a transmitter 840. The device 805 may also include a processor. Each of these components may be in communication with one another (e.g., via one or more buses).

The receiver 810 may receive information such as packets, user data, or control information associated with various information channels (e.g., control channels, data channels, and information related to beam footprints, etc.). Information may be passed on to other components of the device 805. The receiver 810 may be an example of aspects of the transceiver 1020 described with reference to FIG. 10. The receiver 810 may utilize a single antenna or a set of antennas.

The UE communications manager 815 may be an example of aspects of the UE communications manager 715 as described herein. The UE communications manager 815 may include a configuration component 820, a position component 825, a classification component 830, and a beam component 835. The UE communications manager 815 may be an example of aspects of the UE communications manager 1010 described herein. The UE communications manager 815 and/or one or more components (e.g., the configuration component 820, the position component 825, the classification component 830, and the beam component 835) of the UE communications manager 815 may perform and/or be a means for performing, either alone or in combination with other elements, one or more operations for managing beam coverage area representations in wireless communications systems.

The configuration component 820 may determine a beam configuration associated with a set of directional beams of a base station, the beam configuration including a set of identifiers associated with the set of directional beams. The position component 825 may determine beam position information associated with a coverage area of each directional beam of the set of directional beams based on the beam configuration. The classification component 830 may determine beam classification information associated with the coverage area of each directional beam of the set of directional beams based on the beam configuration. The beam component 835 may select a directional beam of the set of directional beams based on the beam position information and the beam classification information and communicate with the base station using the directional beam.

The transmitter 840 may transmit signals generated by other components of the device 805. In some examples, the transmitter 840 may be collocated with a receiver 810 in a transceiver component. For example, the transmitter 840 may be an example of aspects of the transceiver 1020 described with reference to FIG. 10. The transmitter 840 may utilize a single antenna or a set of antennas.

Figure 9:
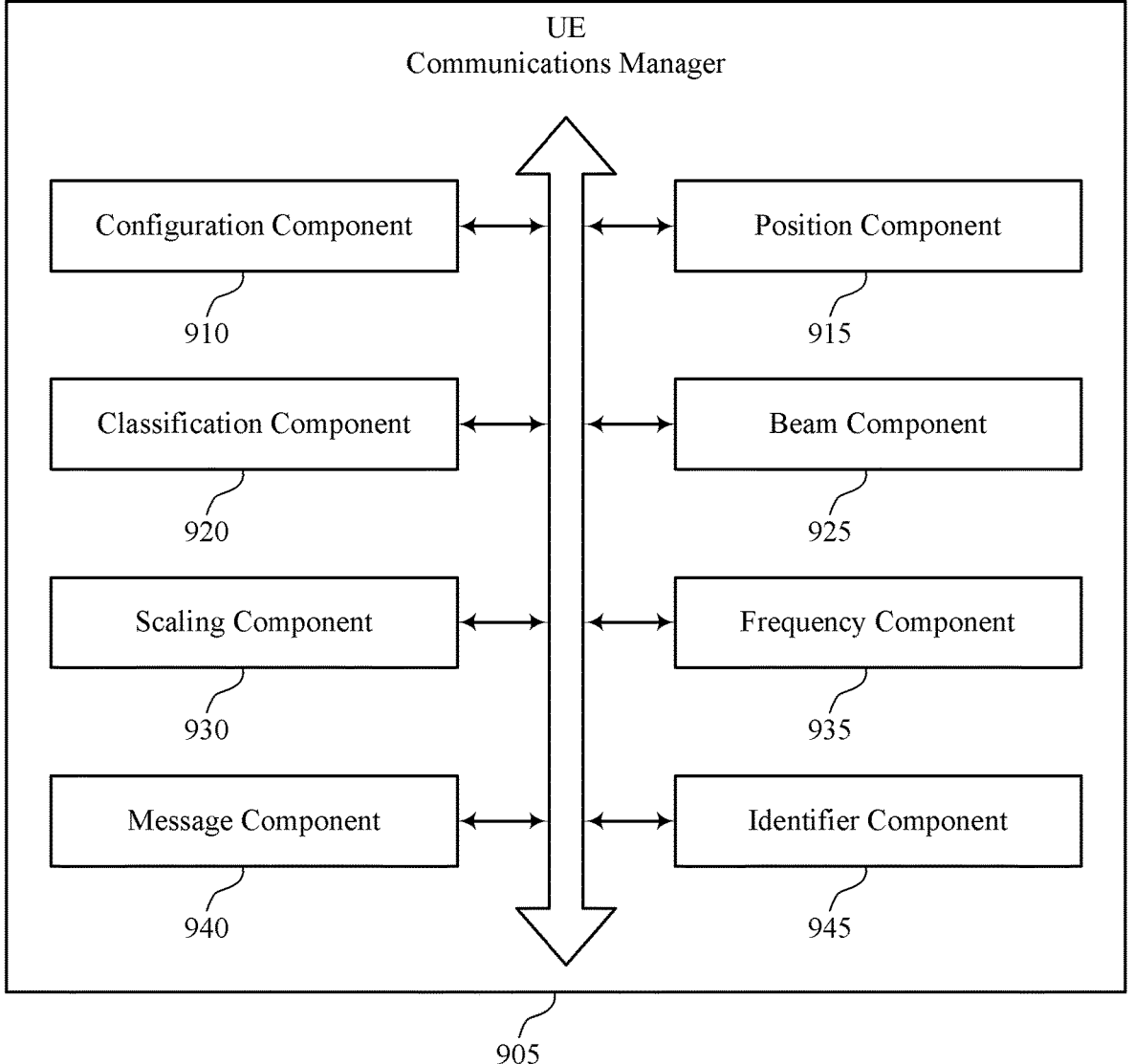
FIG. 9 shows a block diagram of a UE communications manager that supports managing beam coverage area representations in wireless communications systems in accordance with one or more aspects of the present disclosure.

FIG. 9 shows a block diagram 900 of a UE communications manager 905 that supports managing beam coverage area representations in wireless communications systems in accordance with one or more aspects of the present disclosure. The UE communications manager 905 may be an example of aspects of a UE communications manager 715, a UE communications manager 815, or a UE communications manager 1010 described herein. The UE communications manager 905 may include a configuration component 910, a position component 915, a classification component 920, a beam component 925, a scaling component 930, a frequency component 935, a message component 940, and an identifier component 945. Each of these components may communicate, directly or indirectly, with one another (e.g., via one or more buses). As described herein, the UE communications manager 905 and/or one or more components (e.g., the configuration component 910, the position component 915, the classification component 920, the beam component 925, the scaling component 930, the frequency component 935, the message component 940, and the identifier component 945) of the UE communications manager 905 may perform and/or be a means for performing, either alone or in combination with other elements, one or more operations for managing beam coverage area representations in wireless communications systems.

The configuration component 910 may determine a beam configuration associated with a set of directional beams of a base station, the beam configuration including a set of identifiers associated with the set of directional beams. In some examples, the configuration component 910 may determine that each directional beam of the set of directional beams include a single cell based on the beam configuration. In some examples, the configuration component 910 may determine that each directional beam of the set of directional beams includes a separate cell based on the beam configuration. In some cases, the UE is preconfigured with the beam configuration. In some cases, the base station includes a satellite.

The position component 915 may determine beam position information associated with a coverage area of each directional beam of the set of directional beams based on the beam configuration. In some examples, the position component 915 may determine position coordinates of a center of each coverage area of each directional beam of the set of directional beams. In some examples, the position component 915 may determine the position coordinates of the center of each coverage area of each directional beam as a function of time. In some examples, the position component 915 may determine a set of position coordinates associated with a boundary of each coverage area of each directional beam of the set of directional beams.

The position component 915 may determine a reference directional beam of the set of directional beams based on the beam configuration, communicate an indication that the beam configuration is based at least in part on a use of the reference directional beam, where determining the beam position information includes determining position coordinates of a center of a coverage area of the reference directional beam of the set of directional beams. In some examples, the position component 915 may determine the position coordinates of the center of the coverage area of the reference directional beam as a function of time. In some examples, the position component 915 may determine other position coordinates of other centers of other coverage areas of other directional beams of the set of directional beams based on the position coordinates of the center of the coverage area of the reference directional beam and location information associated with the set of directional beams.

The classification component 920 may determine beam classification information associated with the coverage area of each directional beam of the set of directional beams based on the beam configuration. In some examples, the classification component 920 may determine a shape of the coverage area of each directional beam of the set of directional beams, where the shape of the coverage area includes an ellipse shape, a circle shape, or a hexagon shape, or any combination thereof. In some examples, the classification component 920 may determine a size of the coverage area of each directional beam of the set of directional beams, where the size of the coverage area corresponds to a semi-major axis associated with each directional beam or a semi-minor axis associated with each directional beam, or both. In some examples, the classification component 920 may determine an orientation of the coverage area of each directional beam of the set of directional beams.

The classification component 920 may determine an angle between a predefined line of the coverage area of each directional beam of the set of directional beams and a direction of motion associated with the base station. In some examples, the classification component 920 may determine an angle between a semi-minor axis associated with each directional beam of the set of directional beams and a direction of motion associated with the base station. In some examples, the classification component 920 may determine a direction of a center of the coverage area of each directional beam of the set of directional beams, where the direction includes an azimuth angle or a zenith angle, or both. In some examples, the classification component 920 may determine a width of each directional beam of the set of directional beams. The classification component 920 may determine position coordinates of a center of each coverage area of each directional beam of the set of directional beams based on a direction of a center of a coverage area of a directional beam, a width of a directional beam, or a height associated with the base station, or any combination thereof, the base station including a non-terrestrial base station or a non-terrestrial relay station.

The beam component 925 may select a directional beam of the set of directional beams based on the beam position information and the beam classification information. In some examples, the beam component 925 may communicate with the base station using the directional beam. The scaling component 930 may determine a scaling factor associated with the coverage area of the reference directional beam, where determining the other position coordinates includes determining the other position coordinates of the other centers of the other coverage areas of the other directional beams based on scaling the coverage area of the reference directional beam by the scaling factor.

The frequency component 935 may determine beam frequency information of each directional beam of the set of directional beams based on the beam configuration, where selecting the directional beam includes selecting the directional beam of the set of directional beams based on the beam frequency information. In some examples, the frequency component 935 may determine that each directional beam of the set of directional beams operates in a separate frequency interval based on the beam frequency information. In some examples, the frequency component 935 may determine that each directional beam of the set of directional beams operates in a separate bandwidth part based on the beam frequency information.

The message component 940 may receive a system information message including the beam configuration, the system information message including a SIB, where determining the beam configuration includes determining the beam configuration associated with the set of directional beams of the base station based on the system information message. In some examples, the message component 940 may receive an RRC message including the beam configuration, where determining the beam configuration includes determining the beam configuration associated with the set of directional beams of the base station based on the RRC message. The identifier component 945 may receive an identifier of the base station, where the base station includes a non-terrestrial base station or a non-terrestrial relay station. In some examples, the identifier component 945 may map the identifier of the base station to the set of identifiers associated with the set of directional beams. In some examples, the identifier component 945 may associate the set of directional beams to the base station based on the mapping.

Figure 10:
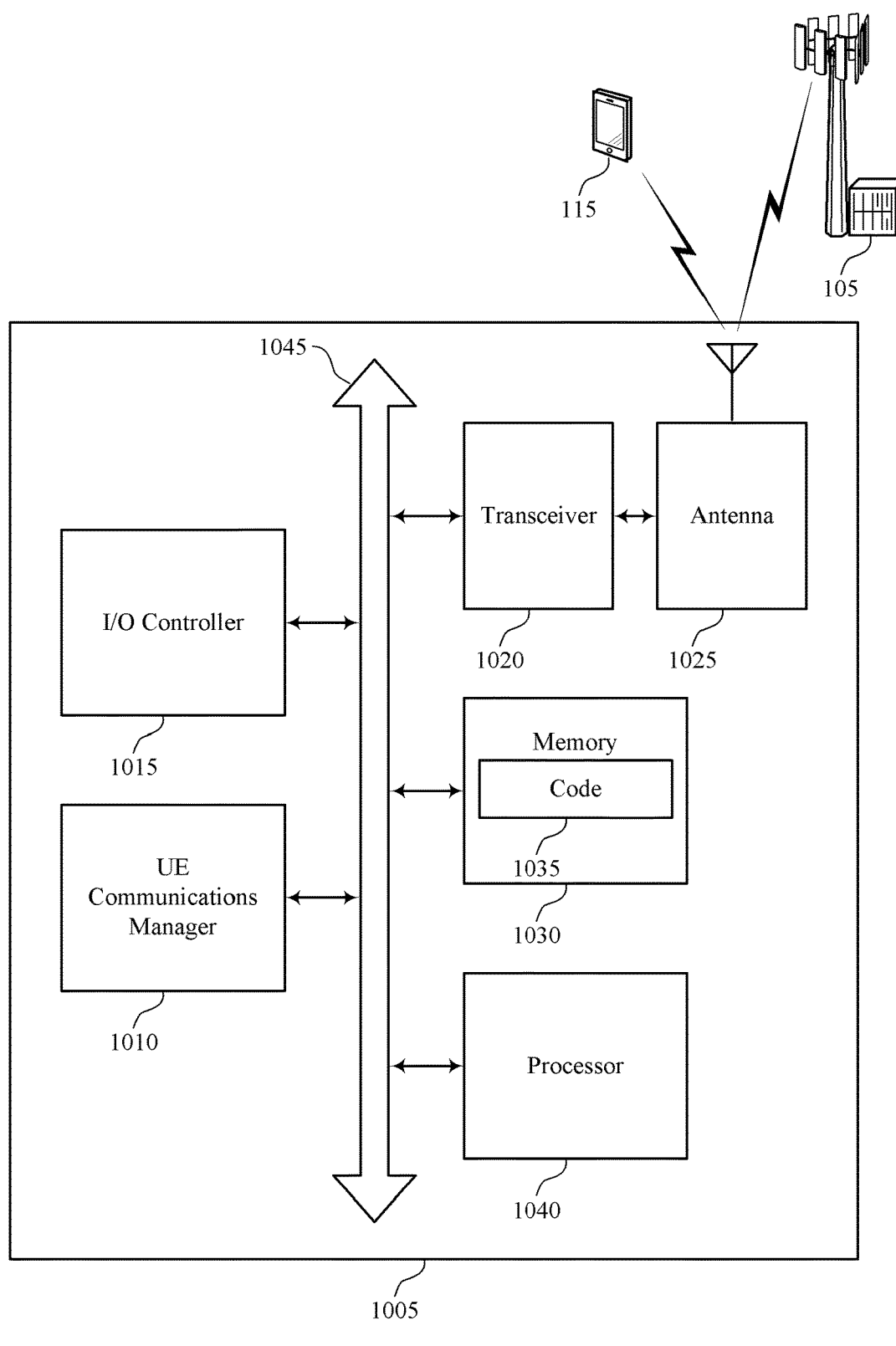
FIG. 10 shows a diagram of a system including a device that supports managing beam coverage area representations in wireless communications systems in accordance with one or more aspects of the present disclosure.

FIG. 10 shows a diagram of a system 1000 including a device 1005 that supports managing beam coverage area representations in wireless communications systems in accordance with one or more aspects of the present disclosure. The device 1005 may be an example of or include the components of device 705, device 805, or a UE 115 as described herein. The device 1005 may include components for bi-directional voice and data communications including components for transmitting and receiving communications, including a UE communications manager 1010, an I/O controller 1015, a transceiver 1020, an antenna 1025, memory 1030, and a processor 1040. These components may be in electronic communication via one or more buses (e.g., bus 1045).

The UE communications manager 1010 may determine a beam configuration associated with a set of directional beams of a base station. the beam configuration including a set of identifiers associated with the set of directional beams. The UE communications manager 1010 may determine beam position information associated with a coverage area of each directional beam of the set of directional beams based on the beam configuration, and determine beam classification information associated with the coverage area of each directional beam of the set of directional beams based on the beam configuration. The UE communications manager 1010 may select a directional beam of the set of directional beams based on the beam position information and the beam classification information, and communicate with the base station using the directional beam. As detailed above, the UE communications manager 1010 and/or one or more components of the UE communications manager 1010 may perform and/or be a means for performing, either alone or in combination with other elements, one or more operations for managing beam coverage area representations in wireless communications systems.

The UE communications manager 1010 may enable the device 1005 to determine beam position information of one or more directional beams for beamformed communications.

In some implementations, the UE communications manager 1010 may enable the device 1005 to determine beam classification information of one or more directional beams for beamformed communications. In some other implementations, the UE communications manager 1010 may enable the device 1005 to determine beam frequency information of one or more directional beams for beamformed communications. Based on implementing the beam position information, the beam classification information, or the beam frequency information, or a combination thereof, one or more processors of the device 1005 (for example, processor(s) controlling or incorporated with the UE communications manager 1010) may experience reduce power consumption and promote high reliability and low latency beamformed communications (for example, downlink and uplink beamformed transmissions), among other benefits.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas. In some cases, the device 1005 may include a single antenna 1025. However, in some cases, the device 1005 may have more than one antenna 1025, which may be capable of concurrently transmitting or receiving multiple wireless transmissions.

The memory 1030 may include RAM and ROM. The memory 1030 may store computer-readable, computer-executable code 1035 including instructions that, when executed, cause the processor 1040 to perform various functions described herein. In some cases, the memory 1030 may contain, among other things, a BIOS which may control basic hardware or software operation such as the interaction with peripheral components or devices. The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting beam footprint representation in wireless communications systems, such as terrestrial networks or non-terrestrial networks, or both).

Figure 11:
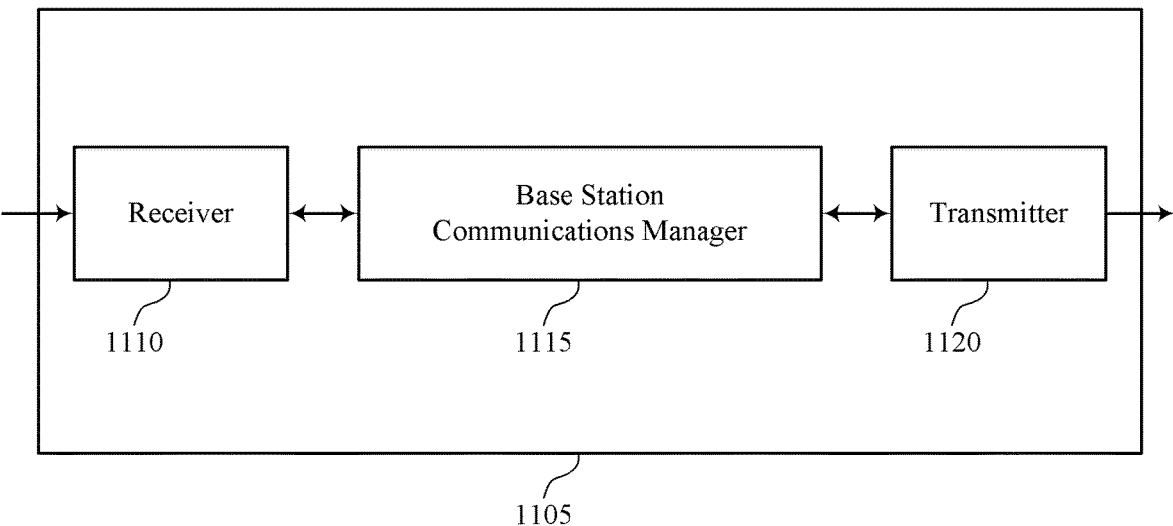
FIGS. 11 and 12 show block diagrams of devices that support managing beam coverage area representations in wireless communications systems in accordance with one or more aspects of the present disclosure.

FIG. 11 shows a block diagram 1100 of a device 1105 that supports managing beam coverage area representations in wireless communications systems in accordance with one or more aspects of the present disclosure. The device 1105 may be an example of aspects of a base station 105 as described herein. The device 1105 may include a receiver 1110, a base station communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to beam footprints, etc.). Information may be passed on to other components of the device 1105. The receiver 1110 may be an example of aspects of the transceiver 1420 described with reference to FIG. 14. The receiver 1110 may utilize a single antenna or a set of antennas.

The base station communications manager 1115 and/or one or more components of the base station communications manager 1115 may perform and/or be a means for performing, either alone or in combination with other elements, one or more operations for managing beam coverage area representations in wireless communications systems. The base station communications manager 1115 may determine a beam configuration associated with a set of directional beams of the base station, the beam configuration including an identifier of the base station and a set of identifiers associated with the set of directional beams and transmit the beam configuration to a UE. The base station communications manager 1115 may be an example of aspects of the base station communications manager 1410 described herein.

The base station communications manager 1115, or its sub-components, may be implemented in hardware, code (e.g., software or firmware) executed by a processor, or any combination thereof. If implemented in code executed by a processor, the functions of the base station communications manager 1115, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The base station communications manager 1115, or its sub-components, may be physically located at various positions, including being distributed such that portions of functions are implemented at different physical locations by one or more physical components. In some examples, the base station communications manager 1115, or its sub-components, may be a separate and distinct component in accordance with various aspects of the present disclosure. In some examples, the base station communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver component. For example, the transmitter 1120 may be an example of aspects of the transceiver 1420 described with reference to FIG. 14. The transmitter 1120 may utilize a single antenna or a set of antennas.

Figure 12:
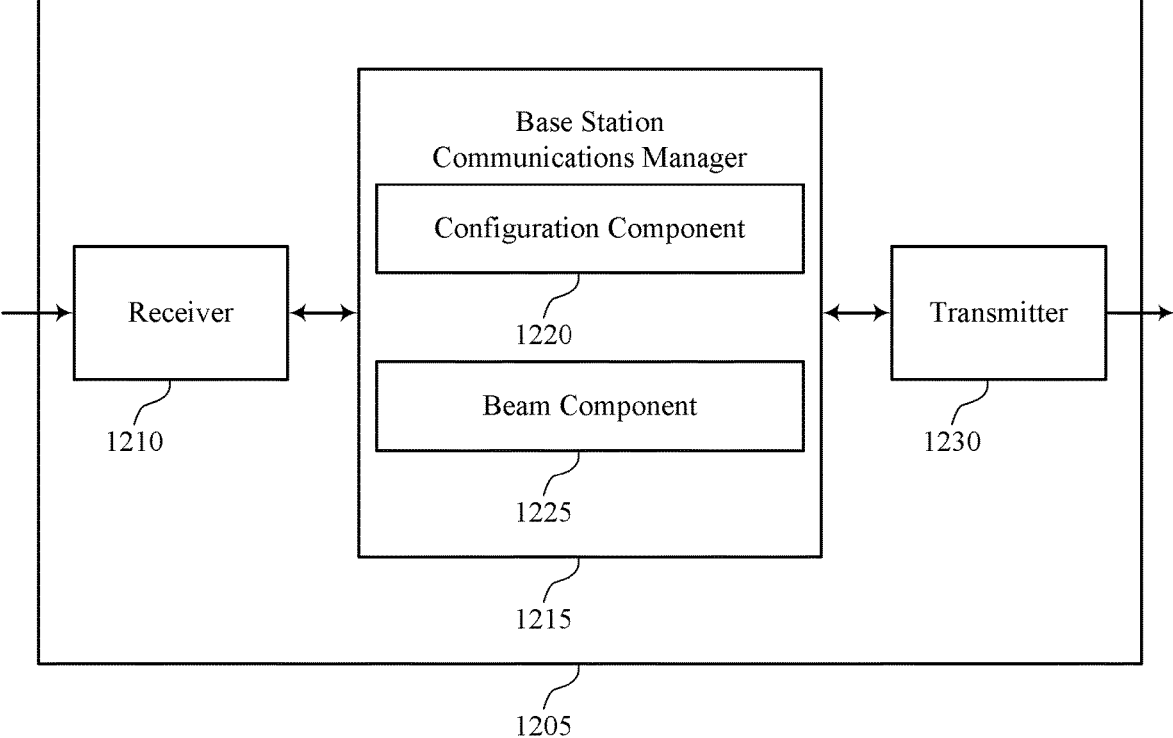

FIG. 12 shows a block diagram 1200 of a device 1205 that supports managing beam coverage area representations in wireless communications systems in accordance with one or more aspects of the present disclosure. The device 1205 may be an example of aspects of a device 1105, or a base station 105 as described herein. The device 1205 may include a receiver 1210, a base station communications manager 1215, and a transmitter 1230. The device 1205 may also include a processor. Each of these components may be in communication with one another (e.g., via one or more buses).

The receiver 1210 may receive information such as packets, user data, or control information associated with various information channels (e.g., control channels, data channels, and information related to beam footprints, etc.). Information may be passed on to other components of the device 1205. The receiver 1210 may be an example of aspects of the transceiver 1420 described with reference to FIG. 14. The receiver 1210 may utilize a single antenna or a set of antennas.

The base station communications manager 1215 may be an example of aspects of the base station communications manager 1115 as described herein. The base station communications manager 1215 may include a configuration component 1220 and a beam component 1225. The base station communications manager 1215 may be an example of aspects of the base station communications manager 1410 described herein. The base station communications manager 1215 and/or one or more components (e.g., the configuration component 1220, the beam component 1225) of the base station communications manager 1215 may perform and/or be a means for performing, either alone or in combination with other elements, one or more operations for managing beam coverage area representations in wireless communications systems. The configuration component 1220 may determine a beam configuration associated with a set of directional beams of the base station, the beam configuration including an identifier of the base station and a set of identifiers associated with the set of directional beams. The beam component 1225 may transmit the beam configuration to a UE.

The transmitter 1230 may transmit signals generated by other components of the device 1205. In some examples, the transmitter 1230 may be collocated with a receiver 1210 in a transceiver component. For example, the transmitter 1230 may be an example of aspects of the transceiver 1420 described with reference to FIG. 14. The transmitter 1230 may utilize a single antenna or a set of antennas.

Figure 13:
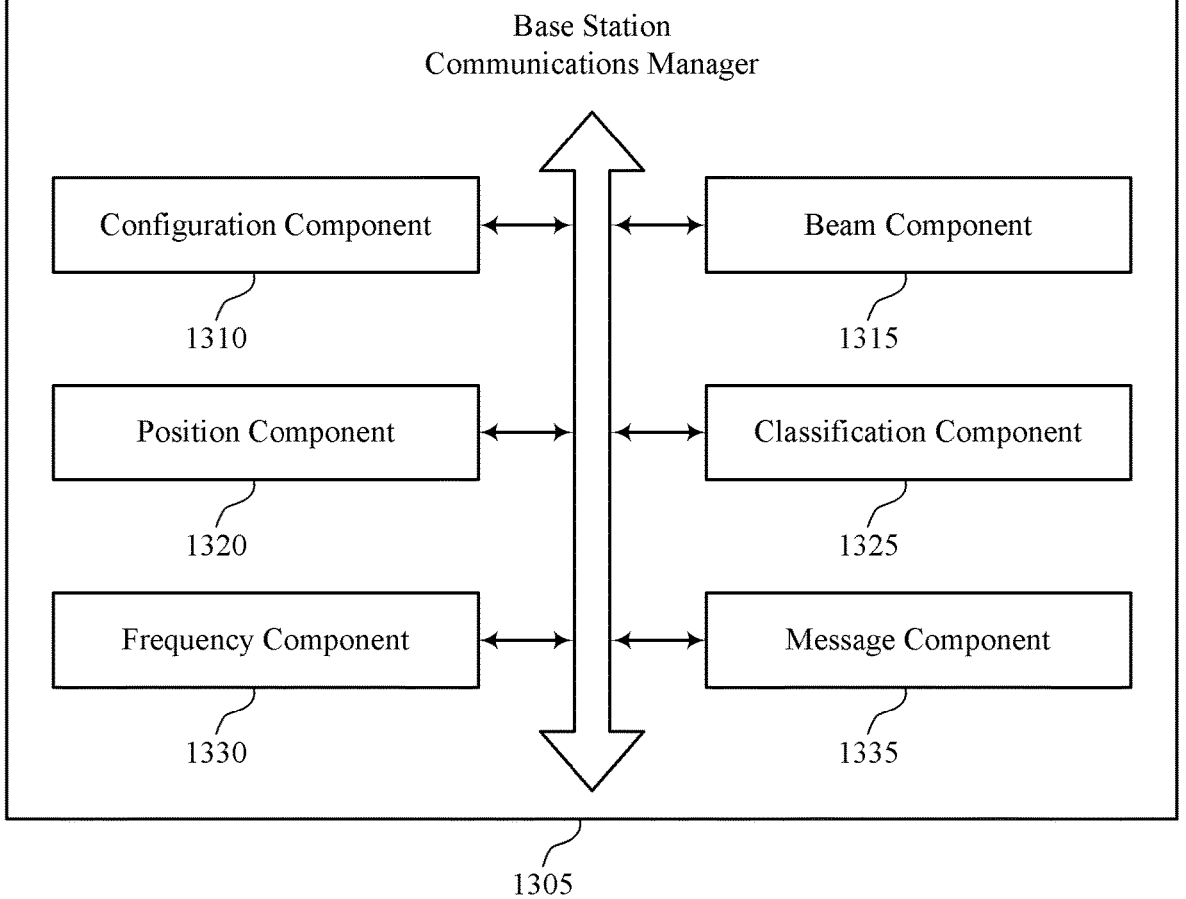
FIG. 13 shows a block diagram of a base station communications manager that supports managing beam coverage area representations in wireless communications systems in accordance with one or more aspects of the present disclosure.

FIG. 13 shows a block diagram 1300 of a base station communications manager 1305 that supports managing beam coverage area representations in wireless communications systems in accordance with one or more aspects of the present disclosure. The base station communications manager 1305 may be an example of aspects of a base station communications manager 1115, a base station communications manager 1215, or a base station communications manager 1410 described herein. The base station communications manager 1305 may include a configuration component 1310, a beam component 1315, a position component 1320, a classification component 1325, a frequency component 1330, and a message component 1335. Each of these components may communicate, directly or indirectly, with one another (e.g., via one or more buses). The base station communications manager 1305 and/or one or more components (e.g., the configuration component 1310, the beam component 1315, the position component 1320, the classification component 1325, the frequency component 1330, and the message component 1335) of the base station communications manager 1305 may perform and/or be a means for performing, either alone or in combination with other elements, one or more operations for managing beam coverage area representations in wireless communications systems.

The configuration component 1310 may determine a beam configuration associated with a set of directional beams of the base station. The beam configuration including an identifier of the base station and a set of identifiers associated with the set of directional beams. In some cases, each directional beam of the set of directional beams operates in a separate frequency interval. In some cases, each directional beam of the set of directional beams operates in a separate bandwidth part. In some cases, each directional beam of the set of directional beams include a single cell. In some cases, each directional beam of the set of directional beams includes a separate cell. In some cases, the base station includes a satellite. In some cases, the base station includes a non-terrestrial base station or a non-terrestrial relay station.

The beam component 1315 may transmit the beam configuration to a UE. The position component 1320 may determine beam position information associated with a coverage area of each directional beam of the set of directional beams, where the beam configuration includes the beam position information associated with the coverage area of each directional beam of the set of directional beams. In some examples, the position component 1320 may determine position coordinates of a center of each coverage area of each directional beam of the set of directional beams. In some examples, the position component 1320 may determine the position coordinates of the center of each coverage area of each directional beam as a function of time. In some examples, the position component 1320 may determine a set of position coordinates associated with a boundary of each coverage area of each directional beam of the set of directional beams.

The classification component 1325 may determine beam classification information associated with a coverage area of each directional beam of the set of directional beams, where the beam configuration includes the beam classification information associated with the coverage area of each directional beam of the set of directional beams. In some examples, the classification component 1325 may determine a shape of the coverage area of each directional beam of the set of directional beams, where the shape of the coverage area includes an ellipse shape, a circle shape, or a hexagon shape, or any combination thereof. In some examples, the classification component 1325 may determine a size of the coverage area of each directional beam of the set of directional beams, where the size of the coverage area corresponds to a semi-major axis associated with each directional beam or a semi-minor axis associated with each directional beam, or both.

The classification component 1325 may determine an orientation of the coverage area of each directional beam of the set of directional beams. In some examples, the classification component 1325 may determine a direction of a center of the coverage area of each directional beam of the set of directional beams, where the direction includes an azimuth angle or a zenith angle, or both. In some examples, the classification component 1325 may determine a width of each directional beam of the set of directional beams. In some examples, the classification component 1325 may determine position coordinates of a center of each coverage area of each directional beam of the set of directional beams based on a direction of a center of a coverage area of a directional beam, a width of a directional beam, or a height associated with the base station, or any combination thereof.

The frequency component 1330 may determine beam frequency information of each directional beam of the set of directional beams, where the beam configuration includes the beam frequency information of each directional beam of the set of directional beams. The message component 1335 may transmit a system information message including the beam configuration, the system information message including a SIB. In some examples, the message component 1335 may transmit an RRC message including the beam configuration.

Figure 14:
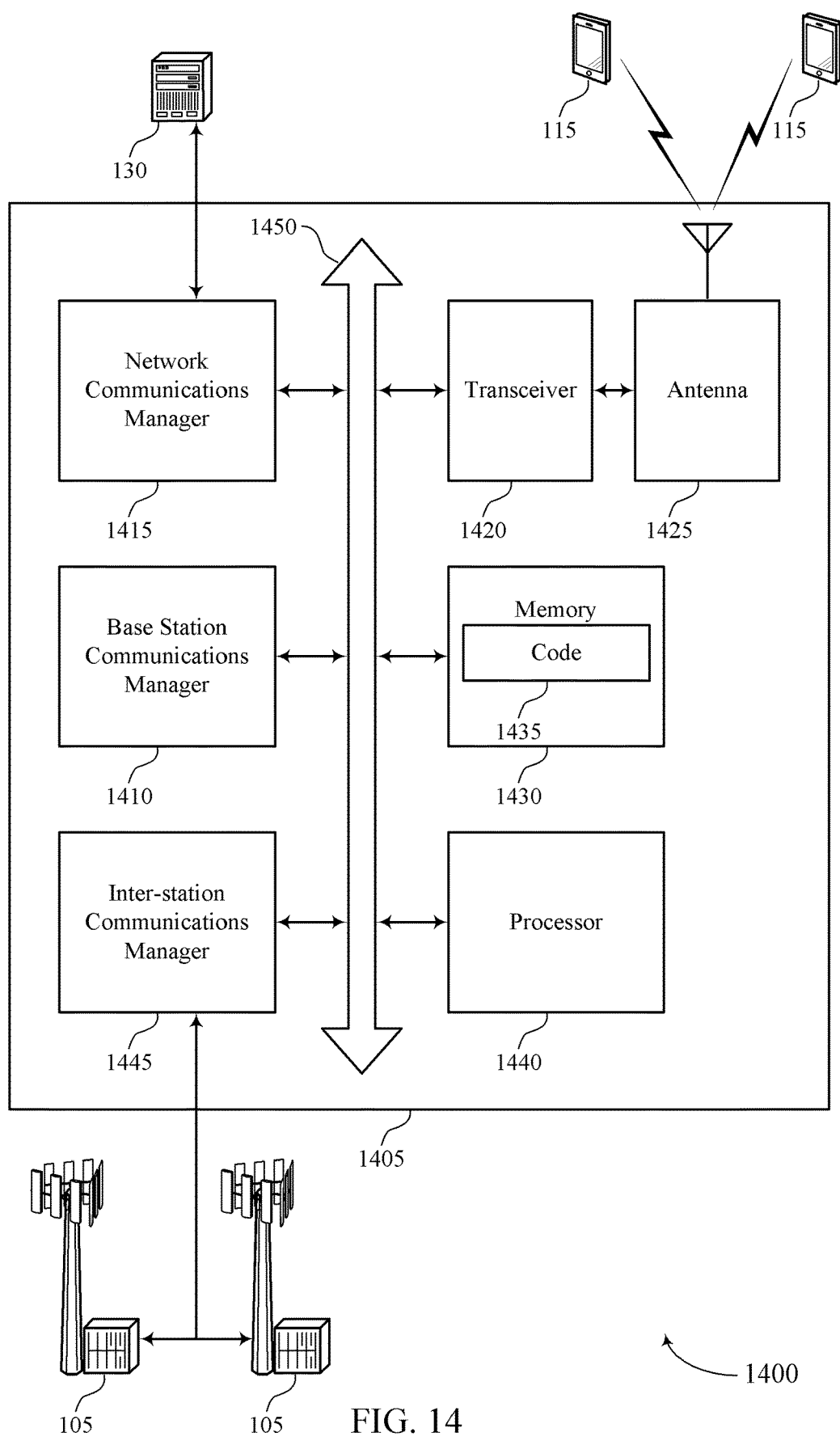
FIG. 14 shows a diagram of a system including a device that supports managing beam coverage area representations in wireless communications systems in accordance with one or more aspects of the present disclosure.

FIG. 14 shows a diagram of a system 1400 including a device 1405 that supports managing beam coverage area representations in wireless communications systems in accordance with one or more aspects of the present disclosure. The device 1405 may be an example of or include the components of device 1105, device 1205, or a base station 105 as described herein. The device 1405 may include components for bi-directional voice and data communications including components for transmitting and receiving communications, including a base station communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The base station communications manager 1410 and/or one or more components of the base station communications manager 1410 may perform and/or be a means for performing, either alone or in combination with other elements, one or more operations for managing beam coverage area representations in wireless communications systems. The base station communications manager 1410 may determine a beam configuration associated with a set of directional beams of the base station. The beam configuration including an identifier of the base station and a set of identifiers associated with the set of directional beams. The base station communications manager 1410 may transmit the beam configuration to a UE. The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas. In some cases, the device 1405 may include a single antenna 1425. However, in some cases, the device 1405 may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices. The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting beam footprint representation in wireless communications systems, such as terrestrial networks or non-terrestrial networks, or both).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

Figure 15:
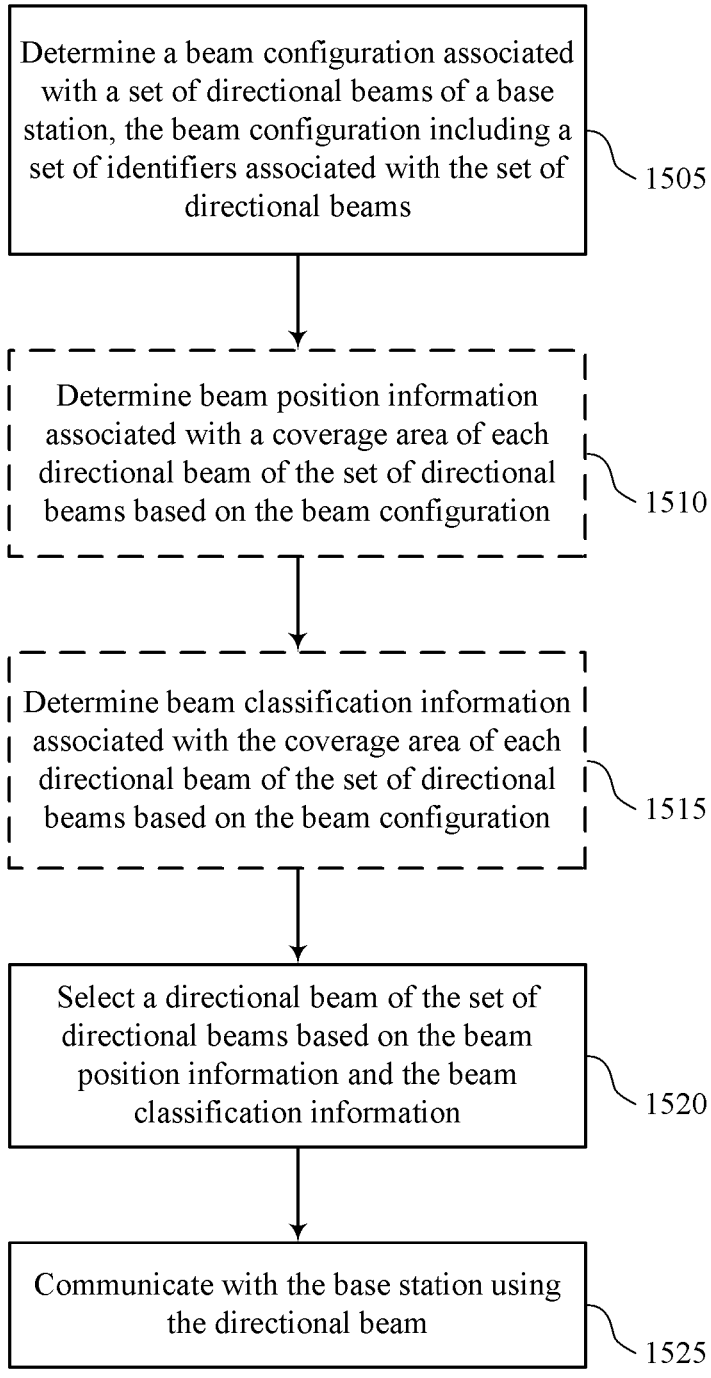

FIG. 15 shows a flowchart illustrating a method 1500 that supports managing beam coverage area representations in wireless communications systems in accordance with one or more aspects of the present disclosure. The operations of method 1500 may be implemented by a UE 115 or its components as described herein. For example, the operations of method 1500 may be performed by a UE communications manager as described with reference to FIGS. 7 through 10. In some examples, the UE 115 may execute a set of instructions to control the functional elements of the UE 115 to perform the functions described below. Additionally or alternatively, the UE 115 may perform aspects of the functions described below using special-purpose hardware.

At 1505, the UE may determine a beam configuration associated with a set of directional beams of a base station, the beam configuration including a set of identifiers associated with the set of directional beams. The operations of 1505 may be performed according to the methods described herein. In some examples, aspects of the operations of 1505 may be performed by a configuration component as described with reference to FIGS. 7 through 10.

At 1510, the UE may determine beam position information associated with a coverage area of each directional beam of the set of directional beams based on the beam configuration. The operations of 1510 may be performed according to the methods described herein. In some examples, aspects of the operations of 1510 may be performed by a position component as described with reference to FIGS. 7 through 10.

At 1515, the UE may determine beam classification information associated with the coverage area of each directional beam of the set of directional beams based on the beam configuration. The operations of 1515 may be performed according to the methods described herein. In some examples, aspects of the operations of 1515 may be performed by a classification component as described with reference to FIGS. 7 through 10.

At 1520, the UE may select a directional beam of the set of directional beams based on the beam position information and the beam classification information. The operations of 1520 may be performed according to the methods described herein. In some examples, aspects of the operations of 1520 may be performed by a beam component as described with reference to FIGS. 7 through 10.

At 1525, the UE may communicate with the base station using the directional beam. The operations of 1525 may be performed according to the methods described herein. In some examples, aspects of the operations of 1525 may be performed by a beam component as described with reference to FIGS. 7 through 10.

FIG. 16 shows a flowchart illustrating a method 1600 that supports managing beam coverage area representations in wireless communications systems in accordance with one or more aspects of the present disclosure. The operations of method 1600 may be implemented by a UE 115 or its components as described herein. For example, the operations of method 1600 may be performed by a UE communications manager as described with reference to FIGS. 7 through 10. In some examples, the UE 115 may execute a set of instructions to control the functional elements of the UE 115 to perform the functions described below. Additionally or alternatively, the UE 115 may perform aspects of the functions described below using special-purpose hardware.

At 1605, the UE may determine a beam configuration associated with a set of directional beams of a base station, the beam configuration including a set of identifiers associated with the set of directional beams. The operations of 1605 may be performed according to the methods described herein. In some examples, aspects of the operations of 1605 may be performed by a configuration component as described with reference to FIGS. 7 through 10.

At 1610, the UE may determine beam position information associated with a coverage area of each directional beam of the set of directional beams based on the beam configuration. The operations of 1610 may be performed according to the methods described herein. In some examples, aspects of the operations of 1610 may be performed by a position component as described with reference to FIGS. 7 through 10.

At 1615, the UE may determine beam classification information associated with the coverage area of each directional beam of the set of directional beams based on the beam configuration. The operations of 1615 may be performed according to the methods described herein. In some examples, aspects of the operations of 1615 may be performed by a classification component as described with reference to FIGS. 7 through 10.

At 1620, the UE may determine beam frequency information of each directional beam of the set of directional beams based on the beam configuration. The operations of 1620 may be performed according to the methods described herein. In some examples, aspects of the operations of 1620 may be performed by a frequency component as described with reference to FIGS. 7 through 10.

At 1625, the UE may select a directional beam of the set of directional beams based on the beam position information, the beam classification information, or the beam frequency information, or a combination thereof. The operations of 1625 may be performed according to the methods described herein. In some examples, aspects of the operations of 1625 may be performed by a beam component as described with reference to FIGS. 7 through 10.

At 1630, the UE may communicate with the base station using the selected directional beam. The operations of 1630 may be performed according to the methods described herein. In some examples, aspects of the operations of 1630 may be performed by a beam component as described with reference to FIGS. 7 through 10.

Figure 17:
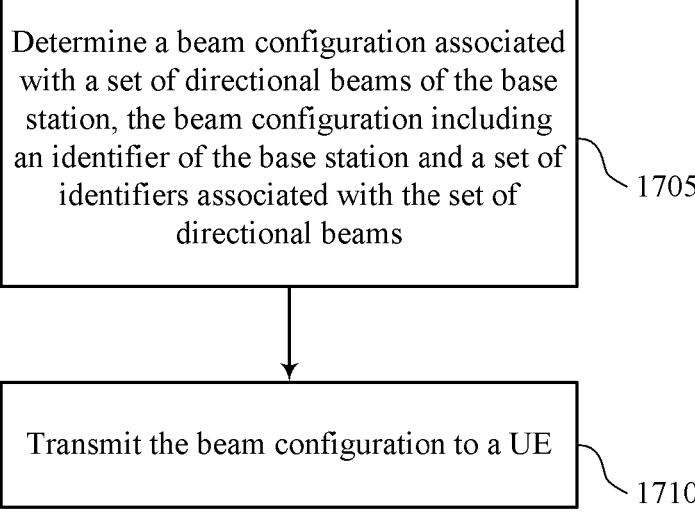

FIG. 17 shows a flowchart illustrating a method 1700 that supports managing beam coverage area representations in wireless communications systems in accordance with one or more aspects of the present disclosure. The operations of method 1700 may be implemented by a base station 105 or its components as described herein. For example, the operations of method 1700 may be performed by a base station communications manager as described with reference to FIGS. 11 through 14. In some examples, the base station 105 may execute a set of instructions to control the functional elements of the base station 105 to perform the functions described below. Additionally or alternatively, the base station 105 may perform aspects of the functions described below using special-purpose hardware.

At 1705, the base station may determine a beam configuration associated with a set of directional beams of the base station, the beam configuration including an identifier of the base station and a set of identifiers associated with the set of directional beams. The operations of 1705 may be performed according to the methods described herein. In some examples, aspects of the operations of 1705 may be performed by a configuration component as described with reference to FIGS. 11 through 14.

At 1710, the base station may transmit the beam configuration to a UE. The operations of 1710 may be performed according to the methods described herein. In some examples, aspects of the operations of 1710 may be performed by a beam component as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

The following provides an overview of examples of the present disclosure:

Example 1: A method for wireless communication at a UE is described. The method may include determining a beam configuration associated with a set of directional beams of a base station, the beam configuration comprising a set of identifiers associated with the set of directional beams; determining beam position information associated with a coverage area of each directional beam of the set of directional beams based at least in part on the beam configuration; determining beam classification information associated with the coverage area of each directional beam of the set of directional beams based at least in part on the beam configuration; selecting a directional beam of the set of directional beams based at least in part on the beam position information and the beam classification information; and communicating with the base station using the directional beam.

Example 2: The method of example 1, wherein determining the beam position information comprises: determining position coordinates of a center of each coverage area of each directional beam of the set of directional beams.

Example 3: The method of example 2, wherein determining the position coordinates comprises: determining the position coordinates of the center of each coverage area of each directional beam as a function of time.

Example 4: The method of any one of examples 1 through 3, wherein determining the beam position information comprises: determining a set of position coordinates associated with a boundary of each coverage area of each directional beam of the set of directional beams.

Example 5: The method of any one of examples 1 through 4, further comprising: determining a reference directional beam of the set of directional beams based at least in part on the beam configuration; and communicating an indication that the beam configuration is based at least in part on a use of the reference directional beam, wherein determining the beam position information comprises: determining position coordinates of a center of a coverage area of the reference directional beam of the set of directional beams.

Example 6: The method of example 5, wherein determining the position coordinates comprises: determining the position coordinates of the center of the coverage area of the reference directional beam as a function of time.

Example 7: The method of example 5, further comprising: determining other position coordinates of other centers of other coverage areas of other directional beams of the set of directional beams based at least in part on the position coordinates of the center of the coverage area of the reference directional beam and location information associated with the set of directional beams.

Example 8: The method of example 7, further comprising: determining a scaling factor associated with the coverage area of the reference directional beam, wherein determining the other position coordinates comprises: determining the other position coordinates of the other centers of the other coverage areas of the other directional beams based at least in part on scaling the coverage area of the reference directional beam by the scaling factor.

Example 9: The method of any one of examples 1 through 8, wherein determining the beam classification information comprises: determining a shape of the coverage area of each directional beam of the set of directional beams, wherein the shape of the coverage area comprises an ellipse shape, a circle shape, or a hexagon shape, or any combination thereof Example 10: The method of any one of examples 1 through 9, wherein determining the beam classification information comprises: determining a size of the coverage area of each directional beam of the set of directional beams, wherein the size of the coverage area corresponds to a semi-major axis associated with each directional beam or a semi-minor axis associated with each directional beam, or both.

Example 11: The method of any one of examples 1 through 10, wherein determining the beam classification information comprises: determining an orientation of the coverage area of each directional beam of the set of directional beams.

Example 12: The method of example 11, wherein determining the orientation of the coverage area of each directional beam of the set of directional beams comprises: determining an angle between a predefined line of the coverage area of each directional beam of the set of directional beams and a direction of motion associated with the base station.

Example 13: The method of example 11, wherein determining the orientation of the coverage area of each directional beam of the set of directional beams comprises: determining an angle between a semi-minor axis associated with each directional beam of the set of directional beams and a direction of motion associated with the base station.

Example 14: The method of any one of examples 1 through 13, wherein determining the beam classification information comprises: determining a direction of a center of the coverage area of each directional beam of the set of directional beams, wherein the direction comprises an azimuth angle or a zenith angle, or both.

Example 15: The method of any one of examples 1 through 14, wherein determining the beam classification information comprises: determining a width of each directional beam of the set of directional beams.

Example 16: The method of any one of examples 1 through 15, wherein determining the beam classification information comprises: determining position coordinates of a center of each coverage area of each directional beam of the set of directional beams based at least in part on a direction of a center of a coverage area of a directional beam, a width of a directional beam, or a height associated with the base station, or any combination thereof, the base station comprising a non-terrestrial base station or a non-terrestrial relay station.

Example 17: The method of any one of examples 1 through 16, further comprising: determining beam frequency information of each directional beam of the set of directional beams based at least in part on the beam configuration, wherein selecting the directional beam comprises: selecting the directional beam of the set of directional beams based at least in part on the beam frequency information.

Example 18: The method of example 17, further comprising: determining that each directional beam of the set of directional beams operates in a separate frequency interval based at least in part on the beam frequency information.

Example 19: The method of example 18, wherein determining that each directional beam of the set of directional beams operates in the separate frequency interval comprises: determining that each directional beam of the set of directional beams operates in a separate bandwidth part based at least in part on the beam frequency information.

Example 20: The method of any one of examples 1 through 19, further comprising: receiving a system information message comprising the beam configuration, the system information message comprising a SIB, wherein determining the beam configuration comprises: determining the beam configuration associated with the set of directional beams of the base station based at least in part on the system information message.

Example 21: The method of any one of examples 1 through 20, further comprising: receiving an RRC message comprising the beam configuration, wherein determining the beam configuration comprises: determining the beam configuration associated with the set of directional beams of the base station based at least in part on the RRC message.

Example 22: The method of any one of examples 1 through 21, wherein the UE is preconfigured with the beam configuration.

Example 23: The method of any one of examples 1 through 22, further comprising: receiving an identifier of the base station, wherein the base station comprises a non-terrestrial base station or a non-terrestrial relay station; mapping the identifier of the base station to the set of identifiers associated with the set of directional beams; and associating the set of directional beams to the base station based at least in part on the mapping.

Example 24: The method of any one of examples 1 through 23, further comprising: determining that each directional beam of the set of directional beams comprise a single cell based at least in part on the beam configuration.

Example 25: The method of any one of examples 1 through 24, further comprising: determining that each directional beam of the set of directional beams comprises a separate cell based at least in part on the beam configuration.

Example 26: The method of any one of examples 1 through 25, wherein the base station comprises a satellite.

Example 27: A method for wireless communication at a base station is described. The method may include determining a beam configuration associated with a set of directional beams of the base station, the beam configuration comprising an identifier of the base station and a set of identifiers associated with the set of directional beams; and transmitting the beam configuration to a UE.

Example 28: The method of example 27, further comprising: determining beam position information associated with a coverage area of each directional beam of the set of directional beams, wherein the beam configuration comprises the beam position information associated with the coverage area of each directional beam of the set of directional beams.

Example 29: The method of example 28, wherein determining the beam position information comprises: determining position coordinates of a center of each coverage area of each directional beam of the set of directional beams.

Example 30: The method of example 29, wherein determining the position coordinates comprises: determining the position coordinates of the center of each coverage area of each directional beam as a function of time.

Example 31: The method of example 28, wherein determining the beam position information comprises: determining a set of position coordinates associated with a boundary of each coverage area of each directional beam of the set of directional beams.

Example 32: The method of any one of examples 27 through 31, further comprising: determining beam classification information associated with a coverage area of each directional beam of the set of directional beams, wherein the beam configuration comprises the beam classification information associated with the coverage area of each directional beam of the set of directional beams.

Example 33: The method of example 32, wherein determining the beam classification information comprises: determining a shape of the coverage area of each directional beam of the set of directional beams, wherein the shape of the coverage area comprises an ellipse shape, a circle shape, or a hexagon shape, or any combination thereof Example 34: The method of example 32, wherein determining the beam classification information comprises: determining a size of the coverage area of each directional beam of the set of directional beams, wherein the size of the coverage area corresponds to a semi-major axis associated with each directional beam or a semi-minor axis associated with each directional beam, or both.

Example 35: The method of example 32, wherein determining the beam classification information comprises: determining an orientation of the coverage area of each directional beam of the set of directional beams.

Example 36: The method of example 32, wherein determining the beam classification information comprises: determining a direction of a center of the coverage area of each directional beam of the set of directional beams, wherein the direction comprises an azimuth angle or a zenith angle, or both.

Example 37: The method of example 32, wherein determining the beam classification information comprises: determining a width of each directional beam of the set of directional beams.

Example 38: The method of example 32, wherein determining the beam classification information comprises: determining position coordinates of a center of each coverage area of each directional beam of the set of directional beams based at least in part on a direction of a center of a coverage area of a directional beam, a width of a directional beam, or a height associated with the base station, or any combination thereof Example 39: The method of any one of examples 27 through 38, further comprising: determining beam frequency information of each directional beam of the set of directional beams, wherein the beam configuration comprises the beam frequency information of each directional beam of the set of directional beams.

Example 40: The method of any one of examples 27 through 39, wherein each directional beam of the set of directional beams operates in a separate frequency interval.

Example 41: The method of any one of examples 27 through 40, wherein each directional beam of the set of directional beams operates in a separate bandwidth part.

Example 42: The method of any one of examples 27 through 41, wherein transmitting the beam configuration comprises: transmitting a system information message comprising the beam configuration, the system information message comprising a SIB.

Example 43: The method of any one of examples 27 through 42, wherein transmitting the beam configuration comprises: transmitting an RRC message comprising the beam configuration.

Example 44: The method of any one of examples 27 through 43, wherein each directional beam of the set of directional beams comprise a single cell.

Example 45: The method of any one of examples 27 through 44, wherein each directional beam of the set of directional beams comprises a separate cell.

Example 46: The method of example 27 through 45, wherein the base station comprises a satellite.

Example 47: The method of any one of examples 27 through 46, wherein the base station comprises a non-terrestrial base station or a non-terrestrial relay station.

Example 48: An apparatus for wireless communication comprising at least one means for performing a method of any one of examples 1 through 26.

Example 49: An apparatus for wireless communication comprising a processor and memory coupled to the processor, the processor and memory configured to perform a method of any one of examples 1 through 26.

Example 50: A non-transitory computer-readable medium storing code for wireless communication, the code comprising instructions executable by a processor to perform a method of any one of examples 1 through 26.

Example 51: An apparatus for wireless communication comprising at least one means for performing a method of any one of examples 27 through 47.

Example 52: An apparatus for wireless communication comprising a processor and memory coupled to the processor, the processor and memory configured to perform a method of any one of examples 27 through 47.

Example 53: A non-transitory computer-readable medium storing code for wireless communication, the code comprising instructions executable by a processor to perform a method of any one of examples 27 through 47.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication at a user equipment (UE) device in a wireless network, comprising:
   one or more processors; and
   one or more memories coupled with the one or more processors, the one or more processors configured to:
      determine a beam configuration associated with a set of directional beams of a network device, wherein the beam configuration comprises a set of identifiers associated with the set of directional beams;
      determine beam position information associated with a coverage area of each directional beam of the set of directional beams based at least in part on the beam configuration;
      determine beam classification information associated with the coverage area of each directional beam of the set of directional beams based at least in part on the beam configuration, wherein the beam classification information comprises an orientation of the coverage area of each directional beam of the set of directional beams, wherein the orientation comprises an angle between the coverage area of each directional beam of the set of directional beams and a direction of motion associated with the network device;
      select a directional beam of the set of directional beams based at least in part on the beam position information and the beam classification information; and
      communicate with the network device via the directional beam.

2. The apparatus of claim 1, wherein, to determine the beam position information, the one or more processors are configured to:
   determine position coordinates of a center of each coverage area of each directional beam of the set of directional beams.

3. The apparatus of claim 2, wherein, to determine the position coordinates, the one or more processors are configured to:
   determine the position coordinates of the center of each coverage area of each directional beam as a function of time.

4. The apparatus of claim 1, wherein, to determine the beam position information, the one or more processors are configured to:

determine a set of position coordinates associated with a boundary of each coverage area of each directional beam of the set of directional beams.

5. The apparatus of claim 1, wherein the one or more processors are further configured to:

determine a reference directional beam of the set of directional beams based at least in part on the beam configuration; and communicate an indication that the beam configuration is based at least in part on a use of the reference directional beam, wherein to determine the beam position information, the one or more processors are configured to:

determine position coordinates of a center of a coverage area of the reference directional beam of the set of directional beams.

6. The apparatus of claim 5, wherein, to determine the position coordinates, the one or more processors are configured to:

determine the position coordinates of the center of the coverage area of the reference directional beam as a function of time.

7. The apparatus of claim 5, wherein the one or more processors are configured to:

determine other position coordinates of other centers of other coverage areas of other directional beams of the set of directional beams based at least in part on the position coordinates of the center of the coverage area of the reference directional beam and location information associated with the set of directional beams.

8. The apparatus of claim 7, wherein the one or more processors are configured to:

determine a scaling factor associated with the coverage area of the reference directional beam, wherein to determine the other position coordinates, the one or more processors are configured to:

determine the other position coordinates of the other centers of the other coverage areas of the other directional beams based at least in part on the coverage area of the reference directional beam that is scaled by the scaling factor.

9. The apparatus of claim 1, wherein to determine the beam classification information the one or more processors are further configured to:

determine a shape of the coverage area of each directional beam of the set of directional beams, wherein the shape of the coverage area comprises an ellipse shape, a circle shape, or a hexagon shape, or any combination thereof.

10. The apparatus of claim 1, wherein to determine the beam classification information the one or more processors are further configured to:

determine a size of the coverage area of each directional beam of the set of directional beams, wherein the size of the coverage area corresponds to a semi-major axis associated with each directional beam or a semi-minor axis associated with each directional beam, or both.

11. The apparatus of claim 1, wherein, to determine the orientation of the coverage area of each directional beam of the set of directional beams, the one or more processors are configured to:

determine an angle between a semi-minor axis associated with each directional beam of the set of directional beams and the direction of motion associated with the network device.

12. The apparatus of claim 1, wherein to determine the beam classification information the one or more processors are further configured to:

determine a direction of a center of the coverage area of each directional beam of the set of directional beams, wherein the direction comprises an azimuth angle or a zenith angle, or both.

13. The apparatus of claim 1, wherein to determine the beam classification information the one or more processors are further configured to:

determine a width of each directional beam of the set of directional beams.

14. The apparatus of claim 1, wherein to determine the beam classification information the one or more processors are further configured to:

determine position coordinates of a center of each coverage area of each directional beam of the set of directional beams based at least in part on a direction of a center of the coverage area of a directional beam, a width of a directional beam, or a height associated with the network device, or any combination thereof, wherein the network device comprises a non-terrestrial base station or a non-terrestrial relay station.

15. The apparatus of claim 1, wherein the one or more processors are further configured to:

determine beam frequency information of each directional beam of the set of directional beams based at least in part on the beam configuration, wherein, to select, the one or more processors are configured to:

select the directional beam of the set of directional beams based at least in part on the beam frequency information.

16. The apparatus of claim 15, wherein the one or more processors are further configured to:

determine that each directional beam of the set of directional beams operates in a separate frequency interval based at least in part on the beam frequency information.

17. The apparatus of claim 16, wherein to determine that each directional beam of the set of directional beams operates in the separate frequency interval, the one or more processors are configured to:

determine that each directional beam of the set of directional beams operates in a separate bandwidth part based at least in part on the beam frequency information.

18. The apparatus of claim 1, wherein the one or more processors are further configured to:

receive a system information message that includes the beam configuration, the system information message that includes a system information block, wherein, to determine the beam configuration, the one or more processors are configured to:

determine the beam configuration associated with the set of directional beams of the network device based at least in part on the system information message.

19. The apparatus of claim 1, wherein the one or more processors are further configured to:

receive a radio resource control message that includes the beam configuration, wherein, to determine the beam configuration, the one or more processors are configured to:

determine the beam configuration associated with the set of directional beams of the network device based at least in part on the radio resource control message.

20. The apparatus of claim 1, wherein the apparatus is preconfigured with the beam configuration.

21. The apparatus of claim 1, wherein the one or more processors are further configured to:

receive, via an antenna of the apparatus, an identifier of the network device, wherein the network device comprises a non-terrestrial base station or a non-terrestrial relay station;

map the identifier of the network device to the set of identifiers associated with the set of directional beams; and associate the set of directional beams to the network device based at least in part on the map between the identifier of the network device and the set of identifiers associated with the set of directional beams.

22. The apparatus of claim 1, wherein the one or more processors are further configured to:

determine that each directional beam of the set of directional beams comprises a single cell based at least in part on the beam configuration.

23. The apparatus of claim 1, wherein the one or more processors are further configured to:

determine that each directional beam of the set of directional beams comprises a separate cell based at least in part on the beam configuration.

24. The apparatus of claim 1, wherein the network device comprises a satellite.

25. An apparatus for wireless communication at a network device in a wireless network, comprising:

one or more processors; and one or more memories coupled with the one or more processors, the one or more processors configured to:

determine a beam configuration associated with a set of directional beams of the apparatus, wherein the beam configuration comprises an identifier of the apparatus and a set of identifiers associated with the set of directional beams and the beam configuration comprises beam classification information associated with a coverage area of each directional beam of the set of directional beams, wherein the beam classification information comprises an orientation of the coverage area of each directional beam of the set of directional beams, wherein the orientation comprises an angle between the coverage area of each directional beam of the set of directional beams and a direction of motion associated with the network device; and transmit the beam configuration.

26. The apparatus of claim 25, wherein the one or more processors are further configured to:

determine beam position information associated with the coverage area of each directional beam of the set of directional beams, wherein the beam configuration comprises the beam position information associated with the coverage area of each directional beam of the set of directional beams, wherein the beam position information comprises a center of the coverage area of each directional beam and a boundary of the coverage area of each directional beam.

27. The apparatus of claim 26, wherein, to determine the beam position information, the one or more processors are configured to:

determine position coordinates of the center of each coverage area of each directional beam of the set of directional beams.

28. The apparatus of claim 27, wherein, to determine the position coordinates, the one or more processors are configured to:

determine the position coordinates of the center of each coverage area of each directional beam as a function of time.

29. The apparatus of claim 26, wherein, to determine the beam position information, the one or more processors are configured to:

determine a set of position coordinates associated with the boundary of each coverage area of each directional beam of the set of directional beams.

30. A method for wireless communication at a user equipment (UE), comprising:

determining a beam configuration associated with a set of directional beams of a network device, wherein the beam configuration comprises a set of identifiers associated with the set of directional beams;

determining beam position information associated with a coverage area of each directional beam of the set of directional beams based at least in part on the beam configuration;

determining beam classification information associated with the coverage area of each directional beam of the set of directional beams based at least in part on the beam configuration, wherein the beam classification information comprises an orientation of the coverage area of each directional beam of the set of directional beams, wherein the orientation comprises an angle between the coverage area of each directional beam of the set of directional beams and a direction of motion associated with the network device;

selecting a directional beam of the set of directional beams based at least in part on the beam position information and the beam classification information; and communicating with the network device using the directional beam.

31. A method for wireless communication at a network device, comprising:

determining a beam configuration associated with a set of directional beams of the network device, wherein the beam configuration comprises an identifier of the network device and a set of identifiers associated with the set of directional beams and the beam configuration comprises beam classification information associated with a coverage area of each directional beam of the set of directional beams, wherein the beam classification information comprises an orientation of the coverage area of each directional beam of the set of directional beams, wherein the orientation comprises an angle between the coverage area of each directional beam of the set of directional beams and a direction of motion associated with the network device; and transmitting the beam configuration.

32. A non-transitory computer-readable medium storing code for wireless communication at a user equipment (UE), the code comprising instructions executable by a processor to:

determine a beam configuration associated with a set of directional beams of a network device, wherein the beam configuration comprises a set of identifiers associated with the set of directional beams;

determine beam position information associated with a coverage area of each directional beam of the set of directional beams based at least in part on the beam configuration;

determine beam classification information associated with the coverage area of each directional beam of the set of directional beams based at least in part on the beam configuration, wherein the beam classification informa-
tion comprises an orientation of the coverage area of
each directional beam of the set of directional beams,
wherein the orientation comprises an angle between the
coverage area of each directional beam of the set of
directional beams and a direction of motion associated
with the network device;

select a directional beam of the set of directional beams
based at least in part on the beam position information
and the beam classification information; and communicate with the network device using the direc-
tional beam.

* * * * *